US010866301B2

(12) United States Patent
Wirola et al.

(10) Patent No.: US 10,866,301 B2
(45) Date of Patent: Dec. 15, 2020

(54) FREQUENCY TRANSFORMED RADIOMAP DATA SET

(71) Applicant: HERE Global B.V., Eindhoven (NL)

(72) Inventors: Lauri Wirola, Tampere (FI); Jari Syrjarinne, Tampere (FI); Jukka Talvitie, Tampere (FI); Elena-Simona Lohan, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/531,582

(22) Filed: Aug. 5, 2019

(65) Prior Publication Data
US 2020/0025861 A1 Jan. 23, 2020

Related U.S. Application Data

(63) Continuation of application No. 14/907,123, filed as application No. PCT/EP2014/066585 on Aug. 1, 2014, now Pat. No. 10,416,272.

(30) Foreign Application Priority Data
Aug. 23, 2013 (GB) .................................. 1315077.6

(51) Int. Cl.
G01S 5/02 (2010.01)
(52) U.S. Cl.
CPC .................. G01S 5/0252 (2013.01)
(58) Field of Classification Search
CPC .................................................. G01S 5/0252
See application file for complete search history.

(56) References Cited

U.S. PATENT DOCUMENTS

| 2001/0040525 | A1 | 11/2001 | Springer et al. |
| 2007/0281634 | A1 | 12/2007 | Rao et al. |
| 2010/0030905 | A1 | 2/2010 | Fikouras |
| 2010/0309051 | A1* | 12/2010 | Moshfeghi ............ H04W 4/029 342/378 |
| 2012/0264447 | A1 | 10/2012 | Rieger, III |
| 2013/0053067 | A1 | 2/2013 | Aggarwal et al. |
| 2013/0196684 | A1 | 8/2013 | Dong et al. |

FOREIGN PATENT DOCUMENTS

| CN | 1224306 A | 7/1999 |
| CN | 102340868 | 2/2012 |
| CN | 102340868 A | 2/2012 |
| EP | 2252124 | 11/2010 |
| GB | 2517488 | 2/2015 |

(Continued)

OTHER PUBLICATIONS

Chinese Office Action for related Chinese Application No. 201480046701.7 dated Jan. 24, 2017, with English Translation.

(Continued)

Primary Examiner — Yu-Hsi D Sun
(74) Attorney, Agent, or Firm — Lempia Summerfield Katz LLC

(57) ABSTRACT

It is disclosed to obtain a frequency transformed radiomap data set by applying a discrete frequency transform to an original radiomap data set. It is also disclosed to obtain a reconstructed radiomap data set by applying an inverse discrete frequency transform to a frequency transformed radiomap data set.

20 Claims, 11 Drawing Sheets

(56) References Cited

FOREIGN PATENT DOCUMENTS

| KR | 20090062737 | 6/2009 |
|----|-------------|--------|
| WO | WO2013/034585 | 3/2013 |
| WO | WO2013034585 A1 | 3/2013 |
| WO | WO2013136123 | 9/2013 |
| WO | WO2013136124 | 9/2013 |
| WO | WO2013136129 | 9/2013 |

OTHER PUBLICATIONS

Chinese Office Action for related Chinese Application No. 201480046701.7 dated Sep. 27, 2017 with English Translation.
European Search Report for related European Application No. GB1315077.6 dated Oct. 20, 2017.
International Search Report and Written Opinion cited in PCT/EP2014/066585, dated Oct. 31, 2014.

* cited by examiner

FREQUENCY TRANSFORMED RADIOMAP DATA SET

This application is a continuation under 35 U.S.C § 120 and 37 C.F.R. § 1.53(b) of U.S. patent application Ser. No. 14/907,123 filed Jan. 22, 2016, which was filed under 35 U.S.C. 371 claiming benefit of PCT Application No. PCT/EP2014/066585 filed on Aug. 1. 2014, which claims the benefit of GB 1315077.6, filed on Aug. 23, 2013, the contents of each of which are incorporated herein by reference.

FIELD OF THE DISCLOSURE

The invention relates to the field of radiomap based positioning.

BACKGROUND

Modern global cellular and non-cellular positioning technologies are based on generating large global databases containing information on cellular and non-cellular communication network nodes, e.g. cellular radio network base stations (BSs) or non-cellular radio network, e.g. WLAN, access points (APs), and their signals. The information may originate entirely or partially from users of these positioning technologies acting as data collectors.

The data provided by these data collectors, generally mobile terminals, is typically in the form of "fingerprints", which contain a location information, e.g. obtained based on received satellite signals of a global navigation satellite system (GNSS), and radio measurement values, i.e. measurements of radio parameters. In addition, a fingerprint may comprise communication network node identification information identifying a node that is observed by the collector and being associated with the radio measurement values pertaining to that node.

This data may then be transferred to a server or cloud, where the data (usually of a multitude of users) may be collected and where a radiomap for positioning purposes may be generated (or updated) based on the data.

In the end, this radiomap may be used for estimating a position, e.g. the position of a mobile terminal. This may function in two modes. The first mode is the terminal-assisted mode, in which the mobile terminal performs the measurements of radio parameters to obtain radio measurement values via a cellular and/or non-cellular air interface, provides the measurements to a remote server, which in turn, based on the radiomap, determines and provides the position estimate back to the mobile terminal. The second mode is the terminal-based mode, in which the mobile terminal has a local copy of the radiomap (or only a subset of a global radiomap), e.g. downloaded by the mobile terminal from a remote server or pre-installed in the mobile terminal.

The actual position estimate may then be obtained based on the radiomap or parts thereof by obtaining identification information of nodes that are observed at the respective position and/or obtaining radio measurement values at that position.

Based on the radiomap or parts thereof, properties of a respective node may be modeled. The model may then be used for position estimation. For instance, the coverage area of nodes may be modeled. For each node that is observed at the respective position, the modeled coverage area may be considered and the position estimate may then be the center of the area of intersection of the coverage area models of all observed nodes. As an alternative to coverage area models (or as an addition allowing more accurate position estimation), also radio channel models (aka radio propagation models) for communication network nodes may serve as a basis for determining a position based on, for instance, a received signal strength and/or a path loss measured at the respective position. A radio channel model may for instance describe how the power of a signal emitted by a communication network node decays with increasing distance from the communication network, for instance under consideration of further parameters as for instance the radio transmission frequency. Now, if radio channel model information is available for an identified communication network node, for instance if a strength of a signal from this communication network node as received at the respective position (or, as another example, the path loss experienced by this signal) has been measured at that position, an estimate of the distance towards the communication network node can be determined and exploited (e.g. among further information) to determine a position estimate.

SUMMARY OF SOME EXAMPLE EMBODIMENTS OF THE INVENTION

Nowadays, even in comparatively small areas, in particular in urban/suburban regions, a very high number of communication network nodes exist. Storing even only radiomap information for some of these nodes may therefore already require significant storages capacities. Likewise, transferring radiomap information to a mobile terminal for position estimation in the terminal consumes a lot of server resources, network bandwidth and data over air, in turn resulting in high costs for the user of the mobile terminal.

According to a first aspect of the present invention, a method performed by an apparatus is disclosed, the method comprising obtaining a frequency transformed radiomap data set by applying a discrete frequency transform to an original radiomap data set.

According to a second aspect of the present invention, a method performed by an apparatus is disclosed, the method comprising obtaining a reconstructed radiomap data set by applying an inverse discrete frequency transform to a frequency transformed radiomap data set.

The method according to the second aspect of the invention may further comprise determining a position of a mobile terminal based on the reconstructed radiomap data set.

For each aspect of the invention, further a first apparatus is disclosed, which is configured to realize or comprises respective means for realizing the actions of the method according to the first aspect and/or second aspect of the invention (and any of its embodiments described herein). The means of this apparatus can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

For each aspect of the invention, further a second apparatus is disclosed, which comprises at least one processor and at least one memory including computer program code, the at least one memory and the computer program code configured to, with the at least one processor, cause an apparatus at least to perform the actions of the method according to the first and/or second aspect of the invention (and any of its embodiments described herein). The apparatus may comprise only the indicated components or one or more additional components. It may be a module or a component for a device, for example a chip. Alternatively, it may be a device, for instance a server or a mobile terminal. Any of the described apparatuses may for instance at least comprise a user interface, a communication interface and/or an antenna.

For each aspect of the invention, further a non-transitory (e.g. tangible) computer readable storage medium is described, in which computer program code is stored, which causes an apparatus to realize the actions of the method according to the first and/or second aspect of the invention (and any of its embodiments described herein) when executed by a processor. The computer readable storage medium could for example be a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the invention.

Any of the described apparatuses may comprise only the indicated components or one or more additional components. Any of the described apparatuses may be a module or a component for a device, for example a chip. Alternatively, any of the described apparatuses may be a device, for instance a server or a mobile terminal, or form part thereof. Examples of such mobile terminals include mobile phones, personal digital assistants (PDAs), mobile computers, e.g. laptops, notebooks or tablet computers, digital music players etc. Any of the described apparatuses may for instance at least comprise a user interface, a communication interface and/or an antenna.

In the following, some explanations of embodiments of the invention are given. For reasons of conciseness, focus is put on the method according to the first aspect of the invention. The given explanations however correspondingly apply to the first apparatus, the second apparatus, the non-transitory computer readable storage medium and the computer program code according to the first aspect of the invention.

The explanations given regarding the fist aspect also pertain to the second aspect of the invention where applicable, including the method according the second aspect of the invention. In particular the explanations regarding the original RMDS and the frequency transformed RMDS given in the context of the first aspect of the invention equally apply to the second aspect of the invention, since the reconstructed RMDS is obtained from the frequency transformed RMDS and the frequency transformed RMDS is obtained from the original RMDS.

It is to be understood that the presentation of embodiments of the invention in this section is merely exemplary and non-limiting.

As an acronym for "radiomap data set", RMDS is used in the following.

By applying a discrete frequency transform to an original RMDS, a frequency transformed RMDS is obtained. The original RMDS is likely to exhibit spatial correlations of at least some of it radio measurement values, i.e. values of measured radio parameters. In particular, radio measurement values associated with nearby locations, e.g. measured or computed for nearby locations, are often strongly correlated. This property of the original RMDS may be exploited. By means of applying a discrete frequency transformation to the original RMDS, a decorrelated representation of the original RMDS in the form of the frequency transformed RMDS may be obtained. Comparatively few transform coefficients obtained by applying the discrete frequency transform to the original RMDS may then suffice for representing the frequency transformed RMDS so that a reconstructed, i.e. inversely transformed, RMDS is still quite true to the original RMDS. The wider the main slope of the autocorrelation function of the original RMDS is, the more may the original RMDS be compressed without loosing essential information. Due to the achieved compression, less storage capacity may be required for storing the frequency transformed RMDS. Likewise transferring the frequency transformed RMDS, e.g. to a mobile terminal, for position estimation may consume less network bandwidth and data over air, in turn resulting in reduced costs for the user. Because of the reduced storage capacity requirements, the frequency transformed RMDS may even be stored in a mobile terminal for which position estimation is to be performed but which has very limited storage capacities. Consequently, estimating a position of the mobile terminal based on the frequency transformed RMDS may be performed offline, i.e. when the mobile terminal has no access to an external data storage on which the frequency transformed RMDS is stored.

In the context of the invention, the original RMDS (and thus also a reconstructed RMDS obtained from the frequency transformed RMDS by means of applying an inverse discrete frequency transform) may comprise radio measurement values, associated location information and associated node identification information identifying a communication network node associated with the radio measurement values or a cell associated with the radio measurement values. A radio measurement value together with its associated location information and its associated node identification information is often referred to as a "fingerprint". An RMDS may thus be thought of as a collection of fingerprints. The frequency transformed RMDS may then comprise a representation of the collection of fingerprints in the frequency domain.

The radio measurement values of an original RMDS (and likewise of a reconstructed RMDS) together with their associated locations may be considered as forming a radio image (each radio measurement corresponding to intensity information of a pixel and the associated location information corresponding to the location of that pixel). Thinking of the radio measurement values and the location information of an RMDS as forming a radio image makes clear, that discrete frequency transforms, which are often applied in image compression, may also be employed for RMDS compression.

The radio measurement values may for instance contain a received signal strength (RSS), e.g. measured in dBm, for instance with a reference value of 1 mW, with or without the Doppler effect being averaged out therein, and/or path losses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node.

The original RMDS may not only comprise radio measurement values actually measured by means of a radio interface. Alternatively or in addition to such radio measurement values, the original RMDS may comprise radio measurement values that are not actually measured but represent a model of a property or several properties of a communication network node/several nodes, for instance a radio coverage model or radio channel model. To give but one example, a calculated radio measurement value obtained in radio coverage area modeling may be a value indicating if its associated location is covered by a respective node indicated by the associated node identification information of the respective fingerprint.

The node identification information may be associated with the RMDS as a whole and thus indirectly with each of the radio measurement values of the RMDS or there may be separate node identification information for each radio measurement value, selected radio measurement values and/or for one group or several groups of radio measurement values. Associating the node identification information with an entire RMDS and thus storing the node identification information only once and not separately for each radio measurement value may be advisable if each radio measurement value of the RMDS is anyway associated with the same communication network node.

While an RMDS may comprise fingerprints associated with different communication network nodes, the discrete frequency transform is to be applied separately to the radio measurement values for different nodes. To achieve this, the original RMDS to which a discrete frequency transform is applied may comprise only fingerprints associated with the same node, i.e. all radio measurements of the original RMDS are associated with the same node. Alternatively, the original RMDS may be partitioned into several RMDSs, wherein the radio measurement values of each RMDS are associated with the same node. A discrete frequency transform may then be separately applied to each of the several RMDSs so that several frequency transformed RMDSs are obtained. Several reconstructed RMDSs may then be obtained by applying an inverse discrete frequency transform to these frequency transformed RMDSs. The several frequency transformed RMDSs may or may not be assembled to a single reconstructed RMDS comprising radio measurement values associated with different communication network nodes at a later stage.

Non-limiting examples of communication networks nodes (also denoted simply as nodes herein) are base stations (or sectors thereof) of a cellular communication network, such as for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication network, or an AP or beacon of a non-cellular radio communication network, such as for instance a WLAN network, a Bluetooth system, a radio-frequency identification (RFID) system a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.). A cellular communication network may for instance be characterized by a basically seamless pavement of a geographical area (usually in the order of at least hundreds or thousands of square kilometers) with cells in which coverage is provided by respective communication network nodes that are operated by the same operator, which network may for instance support communication handover between cells. Consequently, a non-cellular communication network may be characterized as a communication network that does not have all of these properties.

Examples of node identification information may comprise identifiers. Therein, a node of a communication network may for instance have an identifier that is unique (e.g. globally unique) at least in the communication network (and for instance also in all other communication networks). Equally well, a node of a communication network may for instance have an identifier that is not unique (e.g. only locally unique) in the communication network, but that is at least unique in a subregion of the region covered by the communication network.

The identifier of the node may for instance be a cell identifier. Examples of as cellular cell identifiers include e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system. Examples of non-cellular identifiers include identifiers of WLAN access points (e,g. a basic service set identification (BSSID), like a medium access control (MAC) identifier of a WLAN access point or a service set identifier (SSID)).

A mobile terminal the position of which is to be estimated may use one radio interface or several radio interfaces of different types to obtain node identification information on communication network nodes that are observed by the mobile terminal. Based on this identification information a corresponding RMDS or more RMDSs may be selected and used for estimating the position of the mobile terminal.

The location information may in particular comprise discrete coordinates of a discrete coordinate grid or consist of such coordinates. The discrete coordinate grid—and thus its coordinates—may be equally spaced. The discrete coordinate grid may then be referred to as a uniform (discrete) coordinate grid. The location information may for instance have been obtained by means of received satellite signals of a GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS), e.g. by an apparatus. That apparatus may also have obtained a radio measurement value and associated node identification information and have provided them to a server together with the location information, thus acting as data collector that provides fingerprints for radiomap generation.

AN RMDS may for instance be a two-dimensional (2D), a three-dimensional (3D) or a four-dimensional (4D) RMDS. In particular, a 2D RMDS may be considered as an RMDS comprising radio measurement values associated with 2D location information, e.g. an x-coordinate and a y-coordinate. Likewise, a 3D RMDS may be considered as an RMDS comprising radio measurement values associated with 3D location information, e.g. an x-coordinate, a y-coordinate and a z-coordinate. The 3D RMDS may also be layered. Thus, for instance, in an indoor environment one of the three coordinates may indicate the floor of a building rather than an absolute altitude, while the other two coordinates may indicate a position on the respective floor. A layered 3D RMDS may be considered to correspond to a set of several 2D RMDS, each comprising a layer indicator, such as e.g. a floor number. A 4D RMDS may be considered as an RMDS comprising radio measurement values associated with 3D location information, e.g. an x-coordinate, a y-coordinate and a z-coordinate, and further comprising a time value, so that a temporal dependency of a radio environment may be modeled.

The discrete frequency transform that is applied the original RMDS may be any frequency transform that can be applied to a discrete set of fingerprints, i.e. pairs of location information and associated radio measurement values. The discrete frequency transform that is applied the original RMDS may for instance be the Discrete Fourier Transform (DFT), the Discrete Cosine Transform (DCT), the short-time Fourier transform (STFT), the Z-transform or the wavelet transform to name but a few examples. Different implementations of the employed discrete frequency transform may be used in the context of the present invention. For instance, the Fast Cosine Transform (FCT) may be used as an effective algorithm for implementing the DCT. Likewise, the Fast Fourier Transform (FFT) may used for effectively implementing the DFT.

According to an embodiment of the method according to the first aspect of the invention, the method further comprises providing the frequency transformed radiomap data set to another apparatus, e.g. a mobile terminal. The other apparatus may then use the provided frequency transformed RMDS as a basis for estimating its position. As the amount of data of the frequency transformed RMDS may be significantly less than the amount of data of the original RMDS, less network resources may be required for providing the frequency transformed RMDS to the other apparatus.

According to an embodiment of the method according to the first aspect of the invention, the method further comprises obtaining a reconstructed radiomap data set by applying an inverse discrete frequency transform to the frequency transformed radiomap data set.

By applying an inverse discrete frequency transform to the frequency transformed RMDS and thus obtaining a reconstructed RMDS, a basis for performing position estimation is obtained. The inverse frequency transform applied has to be the inverse transform to the frequency transform applied to obtain the frequency transformed RMDS. For instance, if the DCT has been used to obtain the frequency transformed RMDS, the Inverse Discrete Cosine Transform (IDCT) has to be used for reconstruction. If the FFT has been used to obtain the frequency transformed RMDS, the Inverse Fast Fourier Transform (IFFT) has to be used. If the STFT has been used, the Inverse STFT has to be used for reconstruction; if the Z-transform has been used, the Inverse Z-transform has to be used for reconstruction; and if the wavelet transform has been used, the inverse wavelet transform has to be used for reconstruction.

Obtaining the reconstructed RMDS may be performed at the apparatus at which the frequency transformed RMDS has previously been obtained. It may however also be performed at a different apparatus, e.g. at a server or a mobile terminal, to which the frequency transformed RMDS has been provided.

According to an embodiment of the method according to the first aspect of the invention, the method further comprises determining a position of another apparatus, e.g. a mobile terminal, based on the reconstructed radiomap data set.

The position estimation may for instance either be performed at a server, e.g. a server on which the frequency transformed RMDS—and after the inverse frequency transform has been applied also the reconstructed RMDS—is stored. Position estimation may however be also performed at a server different from a server on which the frequency transformed RMDS is stored and/or at which it has been generated. However, position estimation does not have to be performed at a server. It may for instance be performed at the other apparatus, e.g. a mobile terminal, the position of which is to be determined. To this end, the frequency transformed RMDS may have been provided to that apparatus and may have been reconstructed there or the reconstructed RMDS itself may have been provided to that apparatus, e.g. mobile terminal.

Determining the position of the other apparatus, e.g. mobile terminal, may then involve obtaining node identification information of one or several nodes, e.g. a BS of a cellular network and a WLAN AP, that are observed at the respective position of the other apparatus and/or obtaining radio measurement values at that position. Based on the node identification information, a corresponding frequency transformed RMDS having radio measurement values associated with that node may be selected and the corresponding reconstructed RMDS may be obtained by applying the inverse frequency transform. Alternatively, the reconstructed RMDS may have already been computed and may be directly selected. Several RMDSs may be selected if according to the node identification information several nodes for which radio measurement values are encompassed by different RMDSs are observed. However, for reasons of conciseness specifying in every step subsequently elucidated that also several RMDSs may be considered is omitted.

Depending on the content of the original RMDS and thus the frequency transformed RMDS, the reconstructed RMDS may either represent a model of a property or several properties of a node/several nodes or it may comprise raw radio measurement values, i.e. radio measurement values that have not been obtained by modeling but, for example, by actually measuring them or by calculating them e.g. by means of interpolation or extrapolation. If the radio measurement values are raw radio measurement values, for determining a position of the other apparatus, e.g. a mobile terminal, a model may first be created based on the raw radio measurement values first, before position estimation starts.

The model taken or derived from the reconstructed RMDS may for instance model the coverage area of nodes. As an example, the modeled coverage area may be considered and the position estimate may then be the center of the area of intersection of the coverage area models of all observed nodes.

As an alternative to coverage area models (or as an addition allowing more accurate position estimation), also radio channel models (aka radio propagation models) for communication network nodes may serve as a basis for determining a position based on, for instance, a received signal strength and/or a path loss measured at the respective position by means of one or more radio interfaces of the other apparatus, e.g. a mobile terminal. A radio channel model may for instance describe how the power of a signal emitted by a communication network node decays with increasing distance from the communication network, for instance under consideration of further parameters as for instance the radio transmission frequency. Now, if radio channel model information is available for an identified communication network node, for instance if a strength of a signal from this communication network node as received at the respective position (or, as another example, the path loss experienced by this signal) has been measured at that position, an estimate of the distance towards the communication network node can be determined and exploited (e.g. among further information) to determine a position estimate.

According to an embodiment of the method according to the first aspect of the invention, the discrete frequency transform applied to the original radiomap data set is the Discrete Cosine Transform.

DCT may be used for real valued radio measurement values. Efficient implementations of the DCT are available. The DCT may thus be considered as particularly well suited for a high-performance application such as transforming the original RMDS. Moreover, the DCT may provide a low-pass filtering effect. This property may prove advantageous when the DCT is applied to a noisy original RMDS. By varying the number of maintained DCT coefficients, the data amount of the frequency transformed RMDS may be adapted as needed and the low-pass effect may be easily controlled.

According to an embodiment of the method according to the first aspect of the invention, the original radiomap data set comprises radio measurement values and associated discrete coordinate sets of a discrete coordinate grid.

The discrete coordinate grid—and thus its coordinates—may be equally spaced. The discrete coordinate grid may then be referred to as a uniform (discrete) coordinate grid. The discrete coordinate grid may have a limited size. In each dimension the coordinate grid may thus have a limited number of discrete coordinates. When the discrete coordinate grid has a limited size, it also has a limited number of grid points, i.e. valid discrete coordinate sets, e.g. a coordinate pair for a 2D original RMDS, a coordinate triple for a 3D original RMDS and a coordinate quadruple for a 4D original RMDS.

Employing a discrete coordinate grid for the original RMDS enables applying a discrete frequency transform to the original RMDS. The discrete coordinate grid may be fully occupied so that for each grid point, i.e. discrete coordinate set, an associated radio measurement value may be provided.

As the values the discrete coordinate sets may assume are limited compared to continuous coordinate values of a coordinate grid of the same size, the overall number of possible coordinate sets is reduced. The number of fingerprints of the original RMDS is therefore also reduced. Consequently, the amount of data that has to be handled may be reduced.

According to an embodiment of the method according to the first aspect of the invention, the original radiomap data set comprises information on the size of the discrete coordinate grid. The information on the size of the discrete coordinate grid may comprises the number of valid coordinates in each dimension of the discrete coordinate grid, e.g. the lowest valid coordinate index and the highest valid coordinate index in each dimension. In addition, the size information may comprise information on the grid resolution, e.g. information on the distance between valid discrete coordinates, for instance in each dimension of the discrete coordinate grid. Such distances may be measured in meters or the like but other possibilities exist. Further information on this issue may for instance be found in the international patent application PCT/IB2012/051227 which is incorporated herein by reference.

Information on the size of the discrete coordinate grid comprised by the original RMDS may be copied to the frequency transformed RMDS or stored together with the frequency transformed RMDS so that information on the size of the discrete coordinate grid employed may be made available together with the frequency transformed RMDS. This information may be exploited in obtaining the corresponding reconstructed RMDS by applying the inverse discrete frequency transform to the frequency transformed RMDS.

According to an embodiment of the method according to the first aspect of the invention, the original radiomap data set comprises reference location information for the discrete coordinate grid.

The reference location information may enable mapping a discrete coordinate set of the discrete coordinate grid to geographic locations, e.g. to a latitude and longitude pair for a 2D original RMDS or to a latitude, longitude and elevation triple for a 3D original RMDS. To this end, the reference location information may for instance comprise information on the geographic location of one discrete coordinate set or several discrete coordinate sets of the discrete coordinate grid. As an example, the reference location information may comprise information on the geographic location of a discrete coordinate set located at a corner of the discrete coordinate grid or located at the center thereof. In addition, the reference location information may comprise information on the resolution on the discrete coordinate grid, e.g. information on the geographical distance between neighboring valid discrete coordinate sets, for instance for each dimension of the discrete coordinate grid. However, as explained above, the resolution information may also be considered as part of the information on the size of the discrete coordinate grid.

The reference location information may also be used for mapping geographical locations to discrete coordinate sets of the discrete coordinate grid.

The frequency transformed RMDS may also comprise the reference location information, for instance because it has been copied to the frequency transformed RMDS from the original RMDS. Likewise the reconstructed RMDS may comprise reference location information, for instance because it has been copied to reconstructed RMDS from the frequency transformed RMDS or from the original RMDS if available.

It is to be understood that when the discrete frequency transform is applied to the original RMDS, the radio measurement values with the associated discrete coordinate sets, are frequency transformed. Defining the radio measurement values and the associated location information as a radio image, one may also say that the discrete frequency transform is applied to the radio image. The frequency transform is not applied to the reference location information and to the information on the size of the discrete coordinate grid. Likewise, the inverse frequency transform is also not applied to this information but only to the frequency transformed radio measurement values and location information when the inverse frequency transform is applied to the frequency transformed RMDS.

According to an embodiment of the method according to the first aspect of the invention, the method further comprises generating the original radiomap data set.

Generating the original RMDS may be considered as providing an RMDS that is suitable for applying a discrete frequency transform to it. Generating the original RMDS may involve obtaining actual radio measurement values, i.e. measuring them by means of a radio interface. Generating the original RMDS may however also be understood as processing already available radio measurement values or an already available RMDS without performing the measurements themselves. Likewise, the combined steps of measuring a radio parameter to obtain a radio measurement value and of subsequent processing thereof may form part of generating the original RMDS.

According to an embodiment of the method according to the first aspect of the invention, generating the original radiomap data set comprises mapping a radio measurement value to a discrete coordinate set of the discrete coordinate grid.

When a mobile terminal obtains a radio measurement and the position of the mobile terminal at that time as indicated by simultaneously obtained location information, e.g. by means of received satellite signals of a GNSS, does (according to the reference location information) not exactly fall on a valid discrete coordinate set of the discrete coordinate grid, the radio measurement has to be mapped to such to such valid discrete coordinate set. Since the presently discussed embodiment comprises mapping a radio measurement to a discrete coordinate set of the discrete coordinate grid when generating the original RMDS, it is made sure that only valid discrete coordinate sets are associated with the radio measurements of the original RMDS.

Mapping a radio measurement value to discrete coordinates of the discrete coordinate grid may comprise mapping the radio measurement value to the grid point of the discrete coordinate grid, i.e. to a valid set of discrete coordinates, that (according to the reference location information) is closest to the actual location of mobile terminal when the radio measurement value was obtained. Further information on such a mapping scheme may be found in the international patent application PCT/IB2012/051227, which is incorporated herein by reference.

According to an embodiment of the method according to the first aspect of the invention, the original radiomap data set contains for each grid point of the discrete coordinate grid, i.e. for each valid set of discrete coordinates, and for each communication network node not more than one radio measurement value of a specific type. A grid point may however be associated with a plurality of radio measurement values if each radio measurement value thereof is of a different type and or if it is associated with a different communication network node, i.e. with different node identification information. Separate types of radio measurement values as well as radio measurement values associated with different nodes may be separately transformed to the frequency domain.

If in the course of generating the original RMDS several radio value measurements of the same type and associated with the same node are to be mapped to the same grid point, it has to be determined which radio measurement value of that type should become associated with the respective grid point. One approach to this issue is to associate the mean or median of all radio measurement values of that type that are mapped to the grid point with the grid point. Therein, weights may or may not be assigned to the radio measurement values. Further information on how to manage several radio measurement values of the same type and associated with the same node that are to mapped to the same grid point may be found the international patent application PCT/IB2012/051226, which is incorporated herein by reference.

According to an embodiment of the method according to the first aspect of the invention, generating the original radiomap data set comprises obtaining a radio measurement value for each discrete coordinate set of the discrete coordinate grid.

Usually radio measurement values and the associated location information obtained by mobile terminals by means of their radio interfaces are fragmentary in the sense that not for each grid point of a discrete coordinate grid a radio measurement value is available. It is however necessary for being able to apply a discrete frequency transform to the original RMDS that the discrete coordinate grid thereof is fully occupied, i.e. complete in the sense that a radio measurement value is provided for each grid point of the discrete coordinate grid. According to the embodiment presently discussed, it is made sure that the discrete coordinate grid of the original RMDS is fully occupied so that a discrete frequency transform may be applied thereto.

According to an embodiment of the method according to the first aspect of the invention, obtaining a radio measurement for each discrete coordinate set of the discrete coordinate grid comprises calculating a radio measurement value for a discrete coordinate set of the discrete coordinate grid by means of interpolation.

The approach according to this embodiment may help working towards a fully occupied original RMDS by calculating a radio measurement value for a grip point, i.e. discrete coordinate set of the discrete coordinate grid, from the radio measurement values of the respective type and associated with the same node that are already available, in particular from those associated with nearby grid points. Strictly speaking the thus calculated radio measurement values are therefore not actually measured. They are however in this application still referred to as radio measurement values.

The radio measurement value obtained by means of interpolation, i.e. the interpolated radio measurement value, may subsequently be associated with the respective grid point for which it has been obtained.

Various interpolation methods may be employed for obtaining an interpolated radio measurement value.

According to an embodiment of the method according to the first aspect of the invention, a radio measurement value is calculated by means of linear interpolation.

Linear interpolation may be particularly useful for radio measurement values of radio parameters which are linearly dependent on the propagation distance, i.e. the distance between the observing device and the respective observed node. An example for such a radio measurement parameter is the received signal strength (RSS) if it is measured, for instance, in dBm.

Linear interpolation is here meant to encompass bilinear interpolation in case of a 2D original RMDS, trilinear interpolation in case of a 3D original RMDS etc. Before applying the actual interpolation, preparatory steps may be taken. This may for instance involve 2D or 3D Delaunay triangulation. As an example, valid coordinate sets of the discrete coordinate grid for which radio measurement values are available may form the vertices of a triangle (for a 2D RMDS). Interpolated radio measurement values may then be obtained for the coordinate sets which lie inside this triangle and for which no radio measurement values are yet available. The actual interpolation step may then involve employing bilinear interpolation taking the radio measurement values at the vertices of the triangle as a basis.

According to an embodiment of the method according to the first aspect of the invention, obtaining a radio measurement for each discrete coordinate set of the discrete coordinate grid comprises calculating a radio measurement value for a discrete coordinate set of the discrete coordinate grid by means of extrapolation.

Calculating radio measurement values by means of extrapolation may be necessary if for a discrete coordinate set for which a radio measurement value is to be obtained not a sufficient number of radio measurement values is available for discrete coordinate sets in the vicinity of the presently considered discrete coordinate set. There may then not be a sufficient basis for interpolation. This is for instance often the case for discrete coordinate set located at the edges or even corners of the discrete coordinate grid. Extrapolation may allow nevertheless fully occupying the discrete coordinate grid and thus the original RMDS with radio measurement values so that a frequency transform may subsequently be applied to the original RMDS.

Various extrapolation methods may be employed for obtaining an extrapolated radio measurement value.

According to an embodiment of the method according to the first aspect of the invention, a radio measurement value is calculated by means of linear extrapolation.

Linear extrapolation may be particularly useful for radio measurement values of radio parameters which are linearly dependent on the propagation distance, i.e. the distance between the observing device and the respective observed network equipment. An example for such a radio measurement value is the received signal strength (RSS) if it is measured, for instance, in dBm.

According to an embodiment of the method according to the first aspect of the invention, linear extrapolation is based on gradients of available radio measurement values.

Employing gradients of available radio measurement for the linear extrapolation may be considered a simple yet effective approach to obtaining radio measurement values by means of extrapolation. The gradients of the available radio measurement values may for instance either be radio measurement values that have actually been measured by means of radio interfaces of mobile terminals or they may be radio measurement values that have previously been calculated, e.g. by means of interpolation.

According to an embodiment of the method according to the first aspect of the invention, obtaining a radio measurement value for each discrete coordinate set of the discrete coordinate grid comprises first calculating a radio measurement value for a discrete coordinate set of the discrete coordinate grid by means of interpolation and subsequently calculating a radio measurement value for a discrete coordinate set of the discrete coordinate grid by means of extrapolation.

An implementation of such an embodiment may in particular comprise first calculating a radio measurement value for each discrete coordinate set of the discrete coordinate grid by means of interpolation for which calculating a radio measurement value by means of interpolation is possible, e.g. because sufficient radio measurement values associated with nearby discrete coordinate sets are available for the interpolation method employed. Subsequently, a radio measurement value for a each discrete coordinate set of the discrete coordinate grid for which no radio measurement value has previously been calculated by means of interpolation is calculated by means of extrapolation.

First resorting to interpolation for obtaining radio measurement values for discrete coordinate sets of the discrete coordinate grid and then resorting to extrapolation only for obtaining the still missing radio measurement values for the remaining discrete coordinate sets may yield relatively good radio measurement value estimates for the discrete coordinate sets for which no radio measurement value has been obtained by an actual measurement. This is due to the fact that because of the broader data basis considered, interpolation may tend to provide results closer to the radio measurement value that would have been obtained if an actual measurement would have been conducted than extrapolation could provide.

The quality of radio measurement values obtained by means of interpolation or extrapolation depends on the predictability of the respective radio parameter reflected by the radio measurement value. For instance, a radio measurement value reflecting a radio parameter that evolves continuously with the location may be better to predict than a radio measurement value reflecting a radio parameter that does not. The better the interpolation or extrapolation method employed emulates the spatial dependency of the respective radio measurement value/radio parameter, the closer a radio measurement value obtained by means of interpolation or extrapolation may be to the value that would have been obtained by an actual measurement. In indoor 3D scenarios, radio propagation properties may differ significantly in the horizontal and the vertical direction since floor attenuation is often noticeably higher than wall attenuation. It may thus be advisable to use a layered 3D RMDS, i.e. a set of several 2D RMDSs (one for each floor), and then employ floor-wise interpolation or extrapolation to fully occupy each 2D RMDS thereof.

According to an embodiment of the method according to the first aspect of the invention, at least one radio measurement value measured by means of a radio interface is discarded in the process of obtaining a radio measurement value for each discrete coordinate set of the discrete coordinate grid.

Spatial distribution of radio measurement values measured by means of a radio interface, e.g. a radio interface of a mobile terminal, may be uneven. While for some areas a comparatively high number of such radio measurement values may be available, this may not be the case for other areas. This uneven scattering of these radio measurement values may cause problems if radio measurement values are to be calculated by means of interpolation or extrapolation. It may then help to obtain high quality interpolated or extrapolated radio measurement values to discard one radio measurement value or several radio measurement values of the actual radio measurement values, i.e. the radio measurement values measured by means of a radio interface. For instance, at least one actual radio measurement value may be discarded prior to calculating a radio measurement value for a discrete coordinate set of the discrete coordinate grid by means of interpolation or by means of extrapolation.

For better interpolation or extrapolation results, it may be helpful to discard actual radio measurement values that are outliers in the discrete coordinate grid. An outlier may for instance be defined as an actual radio measurement value associated with a discrete coordinate set that exceeds a predetermined distance to the center of gravity of all available actual radio measurement values of the respective RMDS. Alternatively, an outlier could for instance be defined as an actual radio measurement value not having at least a predetermined number of actual radio measurement values associated with discrete coordinate sets within a predetermined distance to the discrete coordinate associated with the radio measurement value and grid point considered. A combination of the above two criteria may as well be applied as other criteria not mentioned here.

According to an embodiment of the method according to the first aspect of the invention, obtaining a radio measurement value for each discrete coordinate set of the discrete coordinate grid comprises calculating a radio measurement value for a discrete coordinate set of the discrete coordinate grid by means of a model of a radio parameter of a communication network node, the radio measurement value reflecting the radio parameter.

According to this embodiment, in occupying the discrete coordinate grid, a model of a radio parameter of a communication network node may be taken into account. This approach may prove helpful in terms of accuracy of a thus obtained radio measurement values in comparison to a radio measurement value calculated according to other methods, e.g. interpolation or extrapolation. Although this does not necessarily have to be the case, due to the computational effort for obtaining the model of the respective radio parameter, employing such a model in the process of fully occupying the discrete coordinate grid may yield an increased processing load in comparison to methods such as interpolation or extrapolation.

That the radio measurement value calculated by means of the model of the radio parameter of the communication network node reflects the radio parameter of that communication network node may be considered to mean that the calculated radio measurement value is of the same type as the modeled radio parameter and that the calculated radio measurement value is associated with communication network node identification information identifying the node for which the radio parameter is modeled.

The modeled radio parameter of the communication network node, which may also be referred to as a property of the communication network node, may for instance be the coverage area of the node. As an alternative to coverage area models, also a radio channel model may be employed. The radio parameter modeled by the radio channel model may for instance be an RSS or a path loss. In this context, the radio channel model may describe how the power of a signal emitted by a communication network node decays with increasing distance from the communication network node. Using this model, a radio measurement value of a corresponding type may be calculated for the discrete coordinate set considered.

The model of the radio parameter of the communication network node may for instance be derived from actual radio measurement values that reflect the respective radio parameter of that node.

Calculating a radio measurement value for a discrete coordinate set of the discrete coordinate grid by means of a model of a radio parameter may be combined with calculating a radio measurement value by means of interpolation and/or by means of extrapolation. For instance, while for some unoccupied discrete coordinate sets of the discrete coordinate grid model based radio measurement value calculation may be performed, interpolation and/or extrapolation may be used for calculating radio measurement values for other discrete coordinate sets of the discrete coordinate grid. Moreover, also in the context of model based radio measurement value calculation discarding of radio measurement values measured by means of a radio interface may be performed. As an example, an actual radio measurement value that differs significantly from several radio measurement values associated with nearby discrete coordinate sets may be discarded because this outlier may deteriorate the quality of a radio parameter model generated based on the actual radio measurement values.

According to an embodiment of the method according to the first aspect of the invention, obtaining a radio measurement value for each discrete coordinate set of the discrete coordinate grid comprises setting a radio measurement value to a predetermined value.

The inventors have found that setting a radio measurement value (or even several radio measurement values) to a predetermined value is a viable option for working towards a fully occupied discrete coordinate grid. The quality of a frequency transformed RMDS obtained based on an original RMDS comprising radio measurement values obtained by setting them to a predetermined value may still be acceptable. This may be attributed to a low-pass filtering effect of the frequency transform.

Setting a radio measurement value to a predetermined value may require very low computational effort and only little time to be performed. It may therefore be useful in many different application contexts. As an example, a radio measurement value for a discrete coordinate set may be set to a predetermined value if a fully occupied coordinate grid is generated at a mobile terminal, e.g. because the frequency transform is applied to the original RMDS at said mobile terminal (for instance in order to reduce transmission resources required to transmit actual radio measurement values acquired by means of a radio interface of the mobile terminal). Mobile terminals often have low processing power (e.g. compared to a server) and even if the processing power is sufficient, performing extensive calculations might drain the battery of the mobile terminal more quickly. Setting a radio measurement value to a predetermined value instead of calculating it by means of interpolation and/or extrapolation and/or based on a radio parameter model may ease the burden on the processing capacities and battery life of the mobile terminal.

The actual predetermined value employed is not crucial. It may however be advisable to use a predetermined value that is not entirely unrealistic, e.g. a predetermined value that an actual radio measurement value would never assume (for instance because of the predetermined value not falling within a range in which an actual radio measurement value has to or may be expected to fall). To give one practical example, if the radio measurement value to be obtained is an RSS value, the predetermined value may be set to a value in the order of −100 dBM.

It is an option to obtain a radio measurement value for each unoccupied discrete coordinate set of the discrete coordinate grid by means of setting them to a predetermined value. However, also the radio measurement values of only one or some of the unoccupied discrete coordinate sets may be set to the predetermined value. Other unoccupied discrete coordinate sets may be occupied by other means, e.g. by means of interpolation and/or extrapolation and/or based on a radio parameter model. If different approaches are used for occupying the discrete coordinate grid, it may be advisable to perform of interpolation and/or extrapolation and/or radio parameter model based radio measurement calculation before obtaining radio measurement values by means of setting them to a predetermined value. Using predetermined values may tend to yield relatively low quality radio measurement values (least true to an actual radio measurement value obtained at the respective position compared to the other approaches). These low quality radio measurement values may affect the quality of the interpolation or extrapolation result. Likewise, they may affect the quality of a radio parameter model if they are taken into account when generating the radio parameter model. They may however be disregarded in interpolation, extrapolation and/or in generating the radio parameter model. For instance, only actual radio measurement values may be taken into account. In this case, interpolation, extrapolation and/or radio parameter model based radio measurement calculation may be performed after having obtained radio measurement values by setting them to a predetermined value.

According to an embodiment of the method according to the first aspect of the invention, the method further comprises determining an error indicator indicating an error of a reconstructed radiomap data set, the reconstructed radiomap data set obtained by applying an inverse discrete frequency transform to the frequency transformed radiomap data set, by comparing the reconstructed radio map data set to the original radiomap data set.

The original RMDS may have a better quality than the reconstructed RMDS. For instance, the cause for such a quality degradation could be that relatively few transform coefficients obtained by applying the discrete frequency transform to the original RMDS are maintained so as to achieve a high compression, i.e. a small data amount of the frequency transformed RMDS. Interpolation or extrapolation performed for occupying the original RMDS may as well affect the quality of the reconstructed RMDS in comparison to the original RMDS. The error indicator may provide information on the effect of these or other detrimental factors. This information may for instance be exploited in the stage of obtaining a frequency transformed RMDS (as explained below) or it may serve as an uncertainty indicator of a position estimate obtained based on the reconstructed RMDS.

The error indicator may for instance be based on a difference between the original RMDS and the reconstructed RMDS, e.g. by subtracting the reconstructed RMDS from the original RMDS. This difference may for instance be calculated by subtracting for each discrete coordinate set of the reconstructed RMDS the associated radio measurement value from the radio measurement value associated with the same discrete coordinate set of the original RMDS. As an example, the error indicator may be the standard deviation of the difference between the original RMDS and the reconstructed RMDS. To name but one alternative, the error indicator may also be based on the sum of the absolute values of each of the differences between the radio measurement values of the original RMDS and the reconstructed RMDS, e.g. normalized with respect to the sum of the absolute values of the radio measurement values of the original RMDS. If in the original RMDS and the reconstructed RMDS several radio measurement values of different types are associated with at least some of the discrete coordinate sets, the radio measurement values of different types may be subtracted separately and partial error indicators may be calculated, e.g. as explained above. Either the set of partial quality indicators as a whole may then constitute the error indicator or it may be formed by the sum of the partial error indicators, the mean or the median thereof etc. Only radio measurement values of the original RMDS and the frequency transformed RMDS are subtracted that are associated with the same node.

The error indicator may be stored for later use. It may for instance be stored together with the frequency transformed RMDS and be transmitted together with the frequency transformed RMDS, e.g. to a mobile terminal that estimates its position based on the frequency transformed RMDS.

According to an embodiment of the method according to the first aspect of the invention, the method comprises maintaining a reduced number of transform coefficients obtained by applying the discrete frequency transform to the original radiomap data set in the frequency transformed radiomap data set.

By applying the discrete frequency transform to the original RMDS, transform coefficients are obtained. Due to the decorrelation property of the discrete frequency transform, it may suffice to maintain not all of the obtained transform coefficients, i.e. to maintain a reduced number of transform coefficients. Thereby, compression of the frequency transformed RMDS is achieved. The reduced number of transform coefficients may suffice for representing the frequency transformed RMDS so that the reconstructed RMDS may still be quite true to the original RMDS even though some information may have been lost. As another potential advantage, maintaining a reduced number of transform coefficients may have a low pass filtering effect. As actual, interpolated and extrapolated radio measurement values and thus the original RMDS tend to be noisy, the low pass effect may be very welcome. It may even out at least some of the noise so that the reconstructed RMDS is less noisy than the original RMDS.

To allow reconstruction by applying the corresponding inverse frequency transform to the frequency transformed RMDS, the transform coefficients that are not maintained may be set to zero before the inverse frequency transform is applied.

According to an embodiment of the method according to the first aspect of the invention, the reduced number of transform coefficients to be maintained in the frequency transformed radiomap data set is a fixed number.

If the reduced number of transform coefficients to be maintained is a fixed number, put differently if it is constant, i.e. independent of the respective frequency transformed or original RMDS, for each frequency transformed RMDS the maintained set of transform coefficients may require the same storage capacity when stored and the same transmission capacity when transmitted. This may greatly simplify resource planning and resource allocation. However, as the spatial correlation of the radio measurement values is not the same for every original RMDS, decorrelation by means of discrete frequency transformation will also not work equally well in any case. Thus, the compression quality will vary. For a fixed number of transform coefficients maintained, the quality of each reconstructed RMDS will therefore also vary.

According to an embodiment of the method according to the first aspect of the invention, the reduced number of transform coefficients to be maintained in the frequency transformed radiomap data set is adapted to attain a predetermined quality of the frequency transformed radiomap data set.

The predetermined quality may for instance be a quality range in that the quality of the frequency transformed RMDS has to fall. To name but one other example, the predetermined quality may be a minimum quality that has to be attained.

Guaranteeing a predetermined quality for each frequency transformed RMDS—and thus for also for the reconstructed RMDSs—may help achieving reliable position estimates based on the reconstructed RMDS. However, as each original RMDS is different and decorrelation by means of discrete frequency transformation will also not work equally well in any case, the number of transform coefficients then needs to be adapted. As a consequence, for each frequency transformed RMDS the maintained set of transform coefficients is likely not to require the same storage capacity when stored and the same transmission capacity when transmitted. This may complicate resource planning and resource allocation. Moreover, logic is needed to determine the number of transform coefficients to be maintained.

To limit the maximum storage and transmission capacity required, a upper limit for the reduced number of transform coefficients to be maintained may be set. Alternatively or in addition, a lower limit for the reduced number of transform coefficients to be maintained may be set.

According to an embodiment of the method according to the first aspect of the invention, adapting the reduced number of transform coefficients is based on the error indicator.

In order to calculate the number of transform coefficients that has to be maintained so that the predetermined quality of the frequency transformed RMDS is attained, a quality indicator is needed. According to the embodiment presently discussed, the error indicator is used as such a quality indicator.

Adapting the reduced number of transform coefficients may then for instance comprise the steps of:
a) applying a discrete frequency transform to the original RMDS;
b) obtaining a first reconstructed RMDS by applying an inverse discrete frequency transform to the thus obtained frequency transformed RMDS, wherein a first reduced number of transform coefficients of the frequency transformed RMDS is considered; and
c) calculating the error indicator for the first reconstructed RMDS.

If the error indicator indicates that the predetermined quality is met, the steps b) and c) are again performed with a second reduced number of transform coefficients lower than the first reduced number being considered so that a second reconstructed RMDS and a further error indicator are obtained. This may then be repeated until the error indicator indicates that the predetermined quality is not met anymore. The lowest number of transform coefficients for which the error indicator for the corresponding reconstructed RMDS indicates that the predetermined quality is attained, may then be maintained in the frequency transformed RMDS.

If, after having performed steps a)-c) for the first time, the error indicator indicates that the predetermined quality is not attained, the steps b) and c) may be performed again with a second reduced number of transform coefficients higher than the first reduced number being considered so that a second reconstructed RMDS and a further error indicator are obtained. This may then be repeated until the error indicator indicates that the predetermined quality is met. The lowest number of transform coefficients for which the error indicator for the corresponding reconstructed RMDS indicates that the predetermined quality is attained, may then be maintained in the frequency transformed RMDS.

In adapting the reduced number of transform coefficients based on the error indicator, a lower or upper limit for the reduced number of transform coefficients may of course also be respected. The lower limit of reduced transform coefficients may then be maintained even if less maintained transform coefficients still allowed the predetermined quality to be attained. Likewise, the upper limit of reduced transform coefficients may be maintained even if more maintained transform coefficients were needed to attain the predetermined quality.

The embodiment described above may help to obtain a good ratio of compression and accuracy.

According to an embodiment of the method according to the first aspect of the invention, the method further comprises selecting specific transform coefficients to be maintained in the frequency transformed radiomap data set.

Apart from fixing a number of transform coefficients to be maintained in the frequency transformed RMDS and thereby influencing the quality of the frequency transformed RMDS and thus the reconstructed RMDS, quality is also determined by which of the transform coefficients are maintained. The selection criterion applied may for instance comprise selecting the C highest absolute value transform coefficients as the transform coefficients to be maintained, wherein C is the reduced number of transform coefficients that is to be maintained. It may thereby be achieved that the transform coefficients comprising the most signal energy, i.e. the biggest part of information of the original RMDS, are maintained.

According to an embodiment of the method according to the first aspect of the invention, the method further comprises applying lossless data compression to the frequency transformed radiomap data set.

By applying lossless data compression to the frequency transformed RMDS, an even higher data compression rate may be achieved than by just applying the discrete frequency transform and maintaining a reduced number of transform coefficients. While applying lossless data compression may render additional processing power for performing the lossless compression and for later performing the corresponding decompression necessary, reduced storage capacities for storing the compressed frequency transformed RMDS and reduced transmission capacities for transmitting it may be required.

The lossless compression algorithm applied may for instance be run length encoding. Decompression may then be performed by run length decoding. Run length encoding may be particularly well suited for the compression of frequency transformed RMDSs. If only a reduced number of transform coefficients is maintained in the frequency transformed RMDS, the frequency transformed RMDS will have transform coefficients that are zero and may become sparse. According to the run length encoding, jumps may denote elements with value zero. Further details on this issue may be found in the international patent application PCT/IB2012/051233 which is incorporated herein by reference.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1:
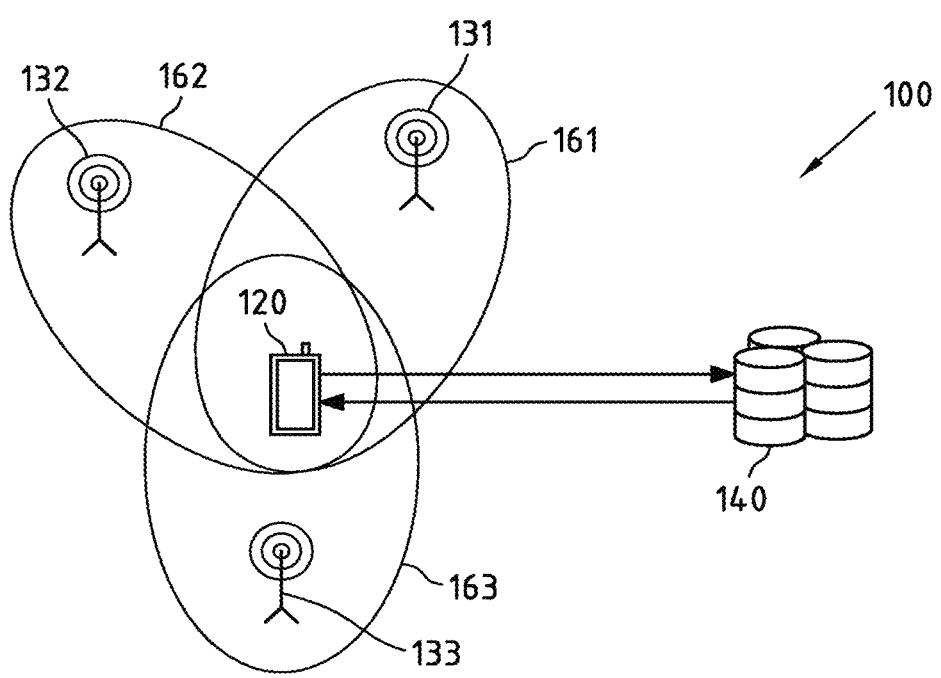
FIG. 1 is a schematic illustration of a positioning system in which example embodiments of the present invention may be employed.

FIG. 1 shows a positioning system 100, in which embodiments of the present invention may be employed. In FIG. 1, mobile terminal 120 is capable of identifying nodes 131, 132 and 133 of one or more communication networks. Each of nodes 131, 132 and 133 provides radio coverage in a respective coverage area 161, 162 and 163. As just one possible example, the node 131 may be a WLAN AP, node 132 may be a BS of an LTE cellular network and node 133 may be a UMTS Node B. Each of the nodes 131, 132 and 133 transmits node identification information identifying the respective node. The identification information may comprise an identifier. Namely, WLAN AP 131 may transmit a MAC identifier, BS 132 an LTE Cell Identity and UMTS Node B 133 transmits a UTRAN Cell ID (UC-ID).

Mobile terminal 120 comprises several communication interfaces. It inter alia comprises a WLAN interface, an LTE interface and a UMTS interface. By means of these interfaces, the mobile terminal 120 is capable of receiving the MAC identifier, the LTE Cell Identity and the UC-ID.

At server 140 of system 100 RMDSs are stored. Each RMDS comprises radio measurement values of a radio parameter. The radio measurement values have been previously measured by mobile terminals such as mobile terminal 120 and have then been reported to server 140. The radio measurement values may for instance contain a received signal strength (RSS), e.g. measured in dBm, for instance with a reference value of 1 mW, with or without the Doppler effect being averaged out therein, and/or pathlosses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node.

Each radio measurement value is associated with location information. The location information may for instance have been obtained by means of GNSS interfaces of the mobile terminals that have provided the radio measurement values. The location information specifies the location at which a radio measurement value has been measured. Moreover, each radio measurement value is associated with node identification information that identifies the communication network node to which the respective radio measurement value pertains. The location information and the node identification information may for instance have been reported to the server 140 together with the radio measurement values.

When a mobile terminal (such as mobile terminal 120) does not have GNSS capabilities, does not want to use these capabilities or demands position information in addition to position information obtained by means of GNSS signals, a positioning request may be provided to server 140. Server 140 may then calculate coverage area and/or radio channel models for each of the nodes 131, 132 and 133 or only some of these nodes based on one or several of the stored RMDSs. Alternatively, such models may have been calculated previously and may be stored at the server 140 so that they may be ready for access when a mobile terminal 120 request a position estimate. These models may also be stored in the form of RMDSs.

The server that calculates the models and the server to which actual radio measurement values have been provided for generating RMDSs may be different entities.

The model taken or derived from the RMDS may for instance model the coverage area of nodes. The coverage areas 161, 162 and 163 of nodes 131, 132 and 133 may for instance be modeled as ellipses. Together with the positioning request, the mobile terminal 120 may provide node identification information for all nodes that are presently observed by it, i.e. nodes 131, 132 and 133, to the server 140. The position of the mobile terminal 120 may then be estimated as lying in the area of intersection, e.g. in the center of the area of intersection, of the coverage area ellipses 161, 162 and 163 of the nodes 131, 132 and 133 observed by the mobile terminal 120.

As an alternative to coverage area models (or as an addition allowing more accurate position estimation), the radio channel models may serve as a basis for determining a position based on, for instance, a RSS and/or a path loss measured at the respective position by means of one or more radio interfaces of the mobile terminal 120. A radio channel model may for instance describe how the power of a signal emitted by a communication network node decays with increasing distance from the communication network, for instance under consideration of further parameters as for instance the radio transmission frequency. Now, if radio channel model information is available for an identified communication network node, for instance if a strength of a signal from this communication network node as received at the respective position (or, as another example, the path loss experienced by this signal) has been measured at that position, an estimate of the distance towards the communication network node can be determined. According to this approach, the position of the mobile terminal 120 may be estimated as being located on an intersection of three arcs. The radius of each of these arcs is given by the respective distance from the mobile terminal 120 to the respective communication network node 131, 132 or 133. It is generally expected that the thus determined position of the mobile terminal 120 falls within the area of intersection of coverage area ellipses 160, 161 and 162. However, due to estimation inaccuracies this does not have to be the case.

Instead of providing node identification information of the nodes observed by mobile terminal 120 and/or radio measurement values such as RSS and/or a path loss measurements from the mobile terminal 120 to the server 140, RMDSs or models derived therefrom may be provided to the mobile terminal 120 and the mobile terminal 120 may then itself determine its position.

Figure 2:
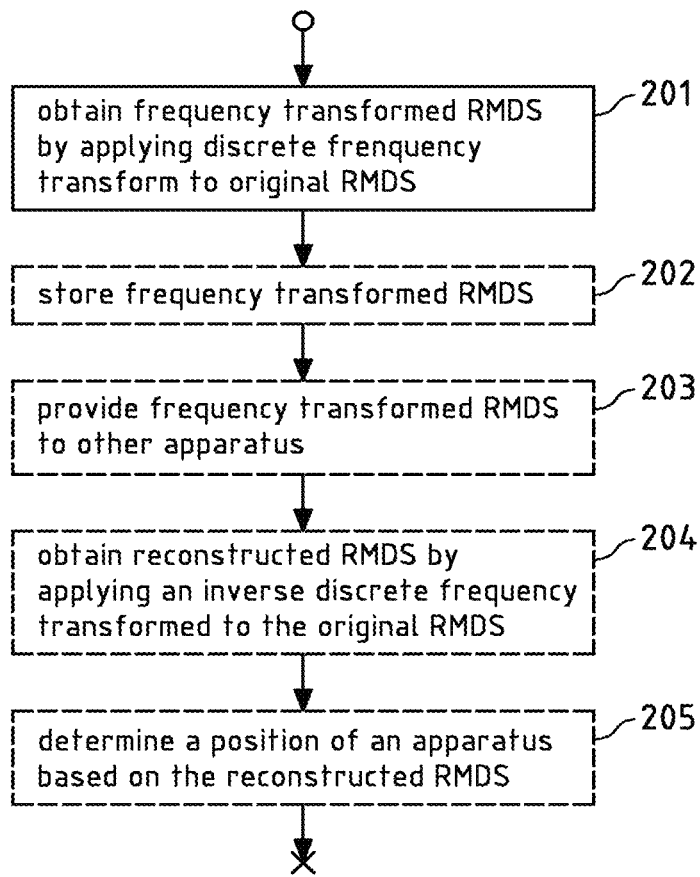
FIG. 2 is a flow chart illustrating a first embodiment of the method according to the first aspect of the invention.
Figure 13:
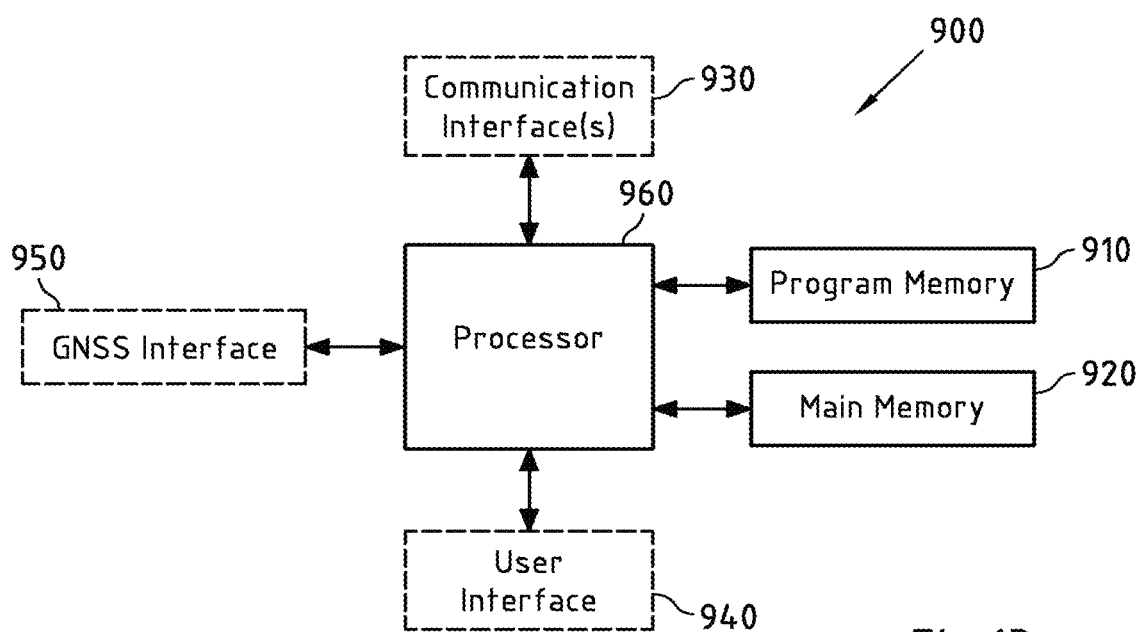
FIG. 13 is a block diagram of an apparatus according to an embodiment of the invention.

FIG. 2 is a flow chart illustrating a first embodiment of the method according to the first aspect of the invention. The method steps of the flow chart of FIG. 2 are performed by an apparatus, such as the apparatus that is depicted in FIG. 13 which will be explained later in this specification.

Method step 201 comprises obtaining a frequency transformed radiomap data set by applying a discrete frequency transform to an original radiomap data set.

The original RMDS comprises fingerprints, i.e. radio measurement values, associated location information and associated node identification information identifying a communication network node associated with the radio measurement values. The location information may for instance comprise discrete coordinate sets of a uniform discrete coordinate grid.

The discrete frequency transform that is employed may be any frequency transform that can be applied to a discrete set of fingerprints. The discrete frequency transform may for instance be the DFT, the DCT, the STFT, the Z-Transform or the wavelet transform to name but a few examples.

By applying a discrete frequency transform to the original RMDS, a frequency transformed RMDS is obtained. The original RMDS is likely to exhibit spatial correlations of at least some of it radio measurement values. In particular, radio measurement values associated with nearby locations are often strongly correlated. This property of the original RMDS may be exploited. By means of applying a discrete frequency transformation to the original RMDS, a decorrelated representation of the original RMDS in the form of the frequency transformed RMDS is obtained. Comparatively few transform coefficients may suffice for representing the frequency transformed RMDS so that an inversely transformed RMDS may still be quite true to the original RMDS. Due to the achieved compression, less storage capacity may be required for storing the frequency transformed RMDS. Likewise transferring the frequency transformed RMDS for position estimation, e.g. from server 140 to mobile terminal 120 in FIG. 1, may consume less network bandwidth and data over air, in turn resulting in reduced costs for the user. Because of the reduced storage capacity requirements, the frequency transformed RMDS may be stored in a mobile terminal, e.g. the mobile terminal 120 of FIG. 1 even if it has very limited storage capacities. Consequently, estimating a position of the mobile terminal 120 based on the frequency transformed RMDS may be performed offline, i.e. without the possibility of communicating with server 140.

Method steps 202 to 205 are considered optional. Therefore, they are marked by dashed lines in the flow chart of FIG. 2.

Method step 202 comprises storing the frequency transformed RMDS. The frequency transformed RMDS may for instance be stored at the server 140 shown in FIG. 1.

Optional step 203 comprises providing the frequency transformed RMDS to another apparatus, e.g. from the server 140 to the mobile terminal 120 shown in FIG. 1.

According to step 204, a reconstructed RMDS is obtained by applying an inverse discrete frequency transform to the frequency transformed RMDS. If optional step 204 is performed by an apparatus that has also performed step 201 and/or optional step 202, step 203 may be omitted. Once step 204 has been executed, the reconstructed RMDS may serve as a basis for determining a position of an apparatus, e.g. the mobile terminal 120 shown in FIG. 1.

In optional method step 205, a position of an apparatus is determined based on the reconstructed RMDS. The apparatus for which the position is determined in step 205 may be the apparatus that performs step 205 or it may be another apparatus from which node identification information and/or radio measurement values have been provided to the apparatus that performs step 205. For example, in the scenario depicted in FIG. 1, step 205 may be performed at the mobile terminal 120 and a position of the mobile terminal 120 may be determined in that step. As an alternative, the position of mobile terminal 120 may be determined in step 205, but step 205 itself may be performed at the server 140. To this end, node identification information of nodes observed by mobile terminal 120 and/or radio measurement values measured by mobile terminal 120 may be transmitted from mobile terminal 120 to server 140.

Figure 3:
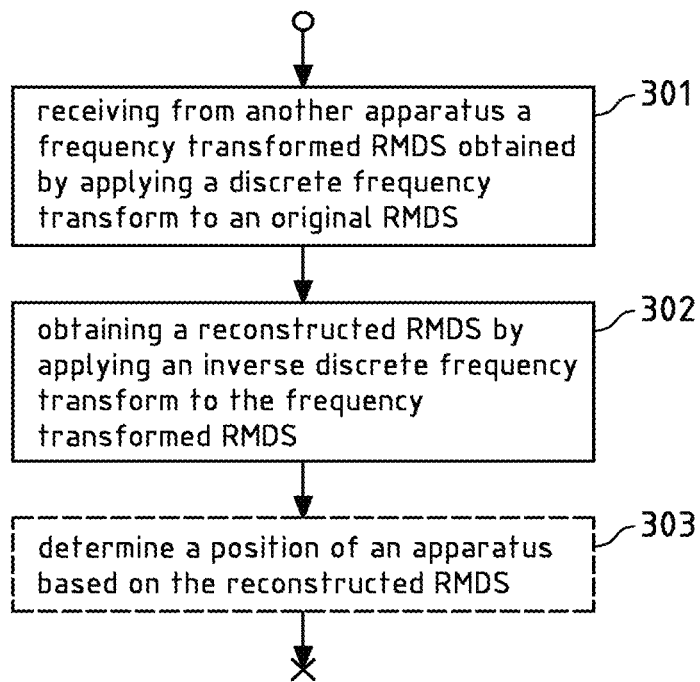
FIG. 3 is a flow chart illustrating a first embodiment of the method according to the second aspect of the invention.

FIG. 3 is a flow chart illustrating a first embodiment of the method according to the second aspect of the invention. The method steps of the flow chart of FIG. 3 are performed by an apparatus, such as the apparatus that is depicted in FIG. 13 which will be explained later in this specification.

Step 301 is optional. It comprises receiving from another apparatus than the apparatus that executes step 301 a frequency transformed RMDS obtained by applying a discrete frequency transform to an original RMDS. In an exemplary scenario, step 301 may for instance be performed at mobile terminal 120 of FIG. 1 and the frequency transformed RMDS may be received from server 140.

Step 302 comprises obtaining a reconstructed RMDS by applying an inverse discrete frequency transform to the frequency transformed RMDS.

In optional method step 303, a position of an apparatus is determined based on the reconstructed RMDS.

Figure 4:
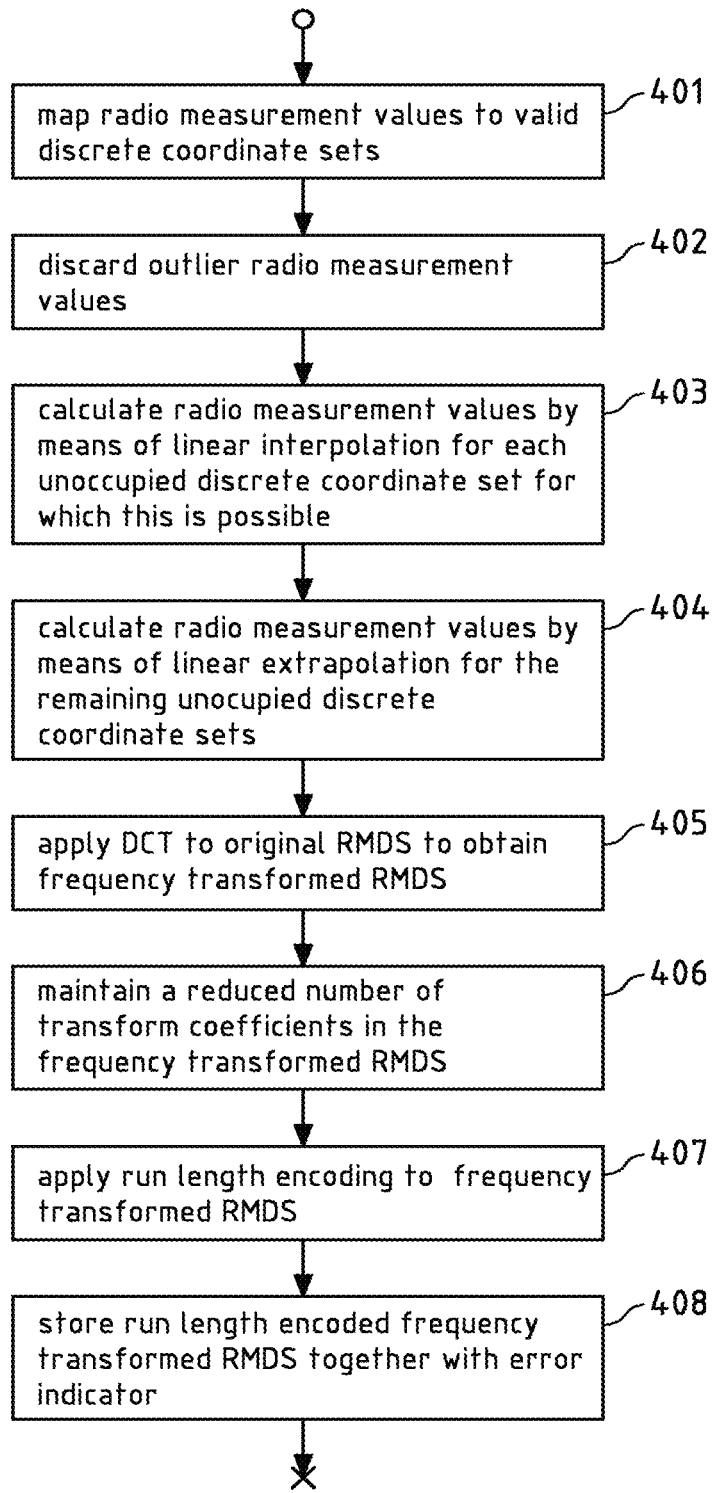
FIG. 4 is a flow chart illustrating a second embodiment of the method according to the first aspect of the invention.

FIG. 4 is a flow chart illustrating a second embodiment of the method according to the first aspect of the invention. The method steps of the flow chart of FIG. 2 are performed by an apparatus, such as the apparatus that is depicted in FIG. 13 which will be explained later in this specification.

The embodiment of the a method according to the first aspect of the invention illustrated in FIG. 4 comprises generating an original RMDS that is suitable for applying a discrete frequency transform to it. As a basis for generating the original RMDS, fingerprints that have actually been measured by a mobile terminal, such as for instance mobile terminal 120 shown in FIG. 1, are used. The original RMDS that is to be generated shall comprise radio measurement values, associated discrete coordinate sets of a discrete uniform coordinate grid having a limited size as location information and associated node identification information. In the context of explaining the embodiment presently discussed, it is assumed that an original RMDS is generated so that it comprises radio value measurement associated with only one communication network node, i.e. all radio measurement values of the original RMDS are associated with the same node.

So as to be able to establish a relationship between the discrete coordinate sets of the discrete coordinate grid of the original RMDS, reference location information is provided that enables mapping discrete coordinate sets of the discrete coordinate grid to geographic locations, e.g. to a latitude and longitude pair for a 2D original RMDS and to a latitude, longitude and elevation triple for a 3D original RMDS. The reference location information may also be used for mapping geographical locations to discrete coordinate sets of the discrete coordinate grid.

Actual Radio measurement values are likely not associated with locations that—taking into account the reference location information—fall exactly on a valid discrete coordinate set, i.e. on a grid point, of the discrete coordinate grid of the original RMDS. Therefore the embodiment of a method according to the invention presently discussed comprises mapping all actual radio measurement values that are to form part of the original RMDS to a discrete coordinate set of the discrete coordinate grid. Each radio measurement value is mapped to the discrete coordinate set that—taking into account the reference location information—is closest to the location at which it has been acquired. The mapped radio measurement values then become associated with the respective discrete coordinate set they have been mapped to. The mapping is performed in step 401. In the context of the discussed embodiment, a discrete coordinate set may only be associated with not more than one radio measurement value of a specific type. If in the course of generating the original RMDS several radio value measurements of the same type are to be mapped to the same grid point, the mean or median of these radio measurement values is associated with that grid point. Therein, weights may or may not be assigned to the radio measurement values.

Figure 5:
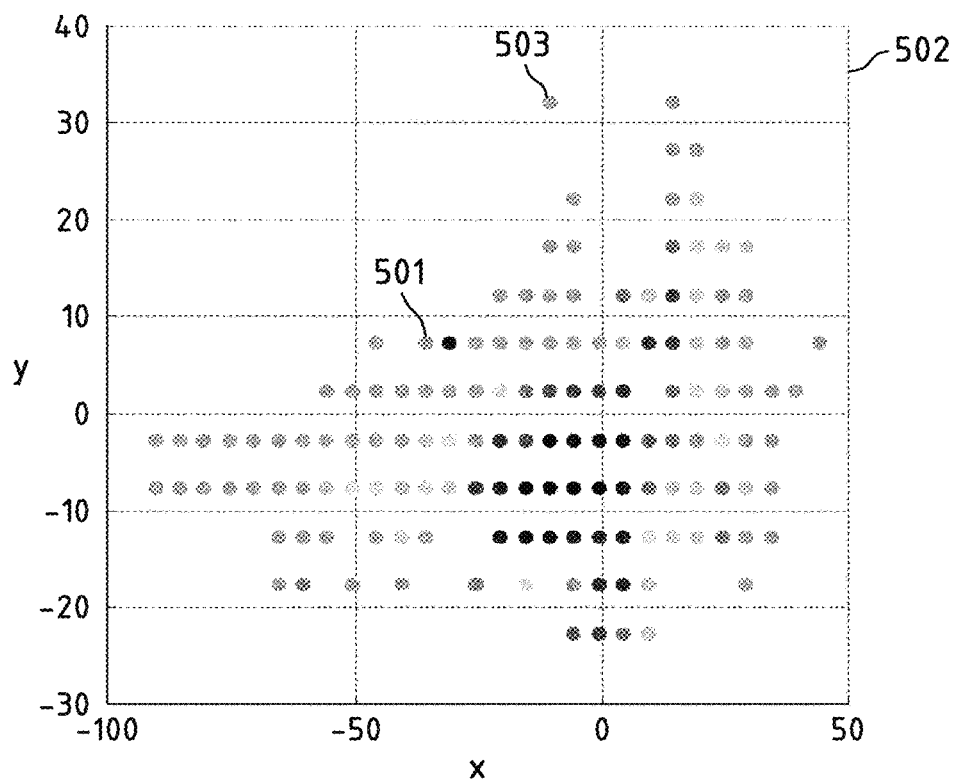
FIG. 5 is an example of a two-dimensional discrete coordinate RMDS.

FIG. 5 shows an example of a 2D discrete coordinate RMDS that has been obtained by mapping radio measurement values 501 to valid discrete coordinates of a discrete coordinate grid 502, e.g. in step 401 shown in the flow chart of FIG. 4. It is assumed that the radio measurement values of the RMDS depicted in FIG. 5 are RSS values measured in dBm. Radio measurement values representing a high RSS are marked by a darker dot than those representing a lower RSS.

Each discrete coordinate set of the grid 502 consists of an x-coordinate and a y-coordinate. Only positive and negative integer coordinate values are permitted. For reasons of clarity, not each permitted coordinate value is indicated by a line in FIG. 5.

Figure 6:
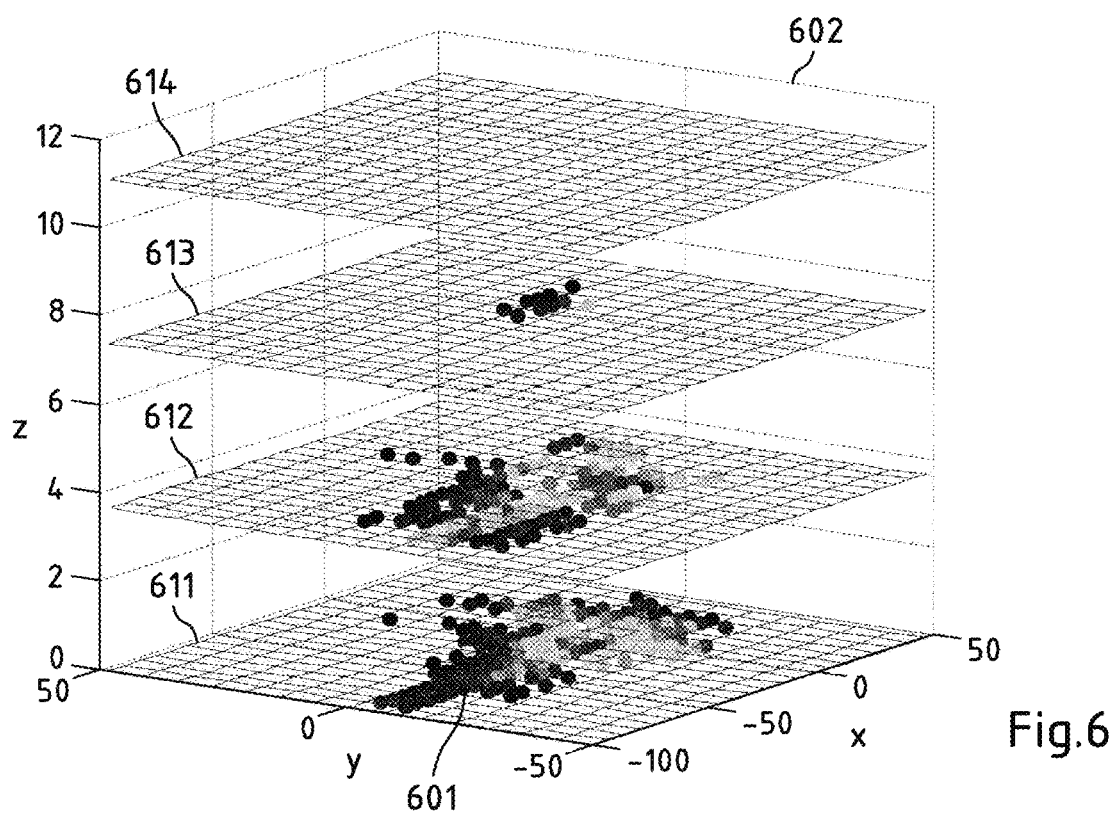
FIG. 6 is an example of a three-dimensional discrete coordinate RMDS.

FIG. 6 shows an example of a 3D discrete coordinate RMDS for a building that has been obtained by mapping radio measurement values 601 to valid discrete coordinate sets of a discrete coordinate grid 602, e.g. in step 401 shown in the flow chart of FIG. 4. The planes 611, 612, 613 and 614 shown in coordinate grid 602 illustrate floors of the building. Each discrete coordinate set consists of an x-coordinate, a y-coordinate and a z-coordinate. Instead of the z-coordinate, a floor indicator, in particular the floor number may be used in the RMDS of FIG. 6. In this case, the 3D RMDS of FIG. 3 is layered. It may be considered as a set of several 2D RMDS, each comprising a floor indicator.

Although not depicted in a figure, the RMDS may also be a 4D RMDS. A 4D RMDS may be considered as an RMDS comprising radio measurement values associated with 3D location information, and further comprising a time value, so that a temporal dependency of a radio environment may be modeled.

In the following an exemplary 2D RMDS is considered. The explanations given below however apply accordingly to 3D and 4D RMDSs.

Returning to FIG. 5, it can be seen that not for each grid point, i.e. valid discrete coordinate set of the discrete coordinate grid 502, a radio measurement value is available. It is however necessary for being able to apply a discrete frequency transform that the discrete coordinate grid of an original RMDS in the sense of the present invention is fully occupied. Generating an original RMDS suitable for applying a discrete frequency transform thereto, therefore requires obtaining a radio measurement for each discrete coordinate set of the discrete coordinate grid of the original RMDS. Assuming that an original RMDS is to be generated based on the RMDS depicted in FIG. 5, radio measurement values thus have to be obtained for each discrete coordinate set that is not yet occupied. To this end, interpolation and extrapolation are used according to the method illustrated in FIG. 4.

Prior to performing interpolation and extrapolation, outlier radio measurement values in the RMDS shown in FIG. 5 are discarded in step 402. An outlier may for instance be defined as an actual radio measurement value associated with a discrete coordinate set that exceeds a predetermined distance to the center of gravity of all the actual radio measurement values of the respective RMDS. Alternatively, an outlier could for instance be defined as an actual radio measurement value not having at least a predetermined number of actual radio measurement values associated with discrete coordinate sets within a predetermined distance to the discrete coordinate set associated with the radio measurement value considered. A combination of the above two criteria may as well be applied as other criteria not mentioned here. Based on these criteria, for instance radio measurement value 503 may be considered as an outlier and may therefore be discarded. This is due to the fact that outliers may cause interpolation or extrapolation problems.

Step 403 of the flow chart of FIG. 4 comprises obtaining radio measurement values, i.e. RSS values, by means of linear interpolation. This is done for each discrete coordinate set of the discrete coordinate grid of the original RMDS that is not yet occupied and for which calculating a radio measurement value by means of linear interpolation is possible. One precondition for being able to apply linear interpolation may be that sufficient radio measurement values associated with nearby discrete coordinate sets are available. This is for instance often not the case for discrete coordinate sets located at the edges of the discrete coordinate grid.

Linear interpolation is used because the radio measurement values considered here are RSS values measured in dBm. As the RSS is linearly dependent on the propagation distance, i.e. the distance between the observing device, e.g. mobile terminal 120 in FIG. 1, and the respective observed communication network node, e.g. any of nodes 131, 132 or 133 in FIG. 1, linear interpolation is a particularly well suited interpolation method and it allows obtaining high quality radio measurement values. The actual interpolation step may be preceded by a 2D Delaunay triangulation step serving for establishing a suitable basis for interpolation. Each interpolated radio measurement value is subsequently associated with the respective grid point for which it has been obtained.

Figure 7:
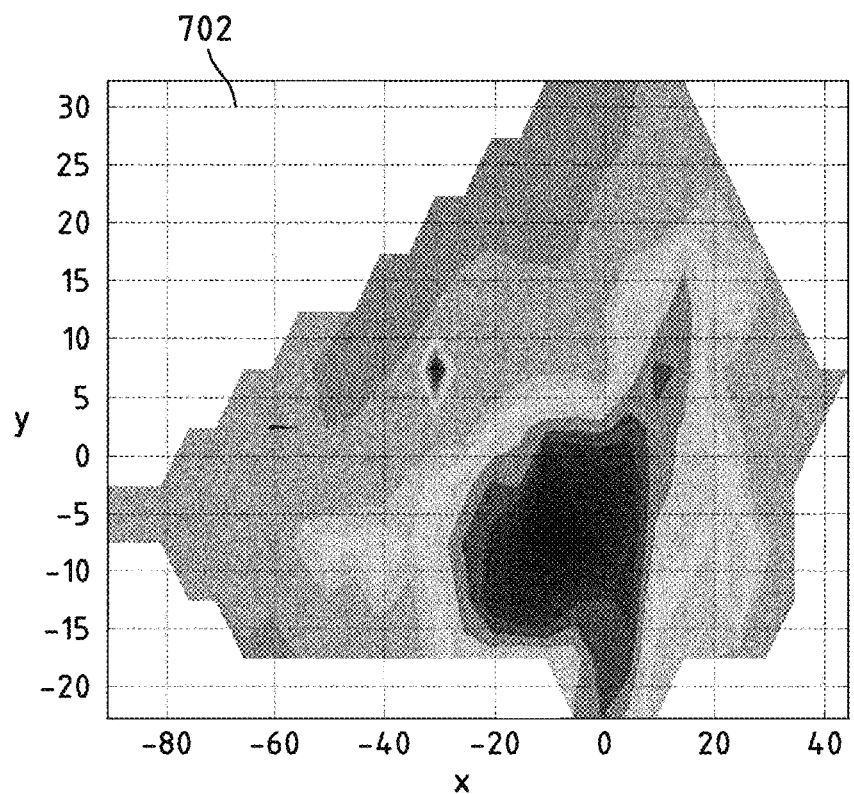
FIG. 7 shows the RMDS of FIG. 5 after having calculated additional radio measurement values by means of interpolation.

FIG. 7 shows the RMDS of FIG. 5 after having performed the interpolation step 403. It can be derived from FIG. 7 that the discrete coordinate grid 702 has a limited size. The x-coordinate may only assume integer values between −90 and +45 and the y-coordinate may only assume values between −25 and +35. Hence the size of the discrete coordinate grid is 136 along the x-axis and 61 along the y-axis. The values the discrete coordinates of the discrete coordinate grid 702 may assume are thus limited compared to continuous coordinate values of a coordinate grid of the same size. Consequently, the overall number of possible coordinate values is reduced. The number of fingerprints that have to be considered when processing the RMDS illustrated in FIG. 7 is therefore also reduced. Hence, the amount of data that has to be handled is also reduced. For generating the original RMDS, actual radio measurement values shown in FIG. 5 that are associated with discrete coordinates that are out of the limits of discrete coordinate grid 702 may be ignored. Alternatively, the size of discrete coordinate grid 702 may be chosen such that each radio measurement value of FIG. 5 fits within.

In FIG. 7 radio measurement values representing a high RSS are again darker than those representing a lower RSS. It can be seen that in a central area the discrete coordinate grid 702 is densely populated with radio measurement values. As there is a radio measurement provided for each of the discrete coordinate set falling within this area, the radio measurement values are not distinguishable. However, there are still unoccupied areas, in particular at the edges of discrete coordinate grid 702.

In step 404 of the flow chart of FIG. 4, radio measurement values for a each discrete coordinate set of the discrete coordinate grid 502 for which no radio measurement value has previously been calculated by means of interpolation in step 403 is calculated by means of extrapolation. Thus, radio measurement values are calculated for each remaining unoccupied discrete coordinate set of the discrete coordinate grid 702. As the radio measurement values are RSS values measured in dBm, linear extrapolation is a well suited interpolation method and is therefore employed. Namely, a gradient based linear extrapolation approach is used since it is simple to implement yet effective. The gradients are calculated based on the radio measurement values available after the completion of step 403.

Figure 8:
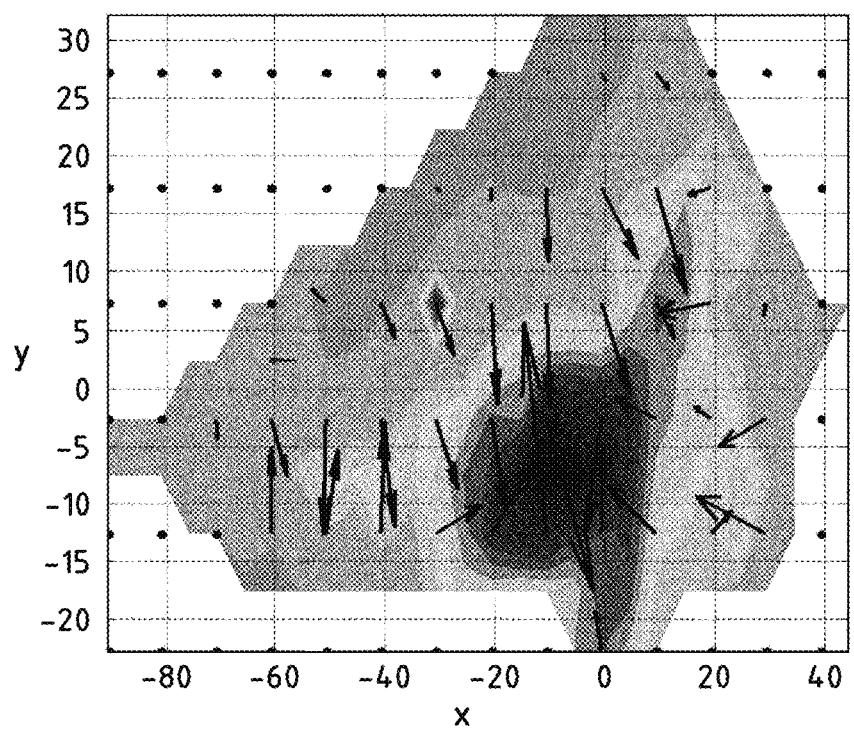
FIG. 8 shows the RMDS of FIG. 7 with superposed radio measurement value gradients.

FIG. 8 shows the RMDS of FIG. 7 with superposed radio measurement value gradients in the form of arrows.

Figure 9:
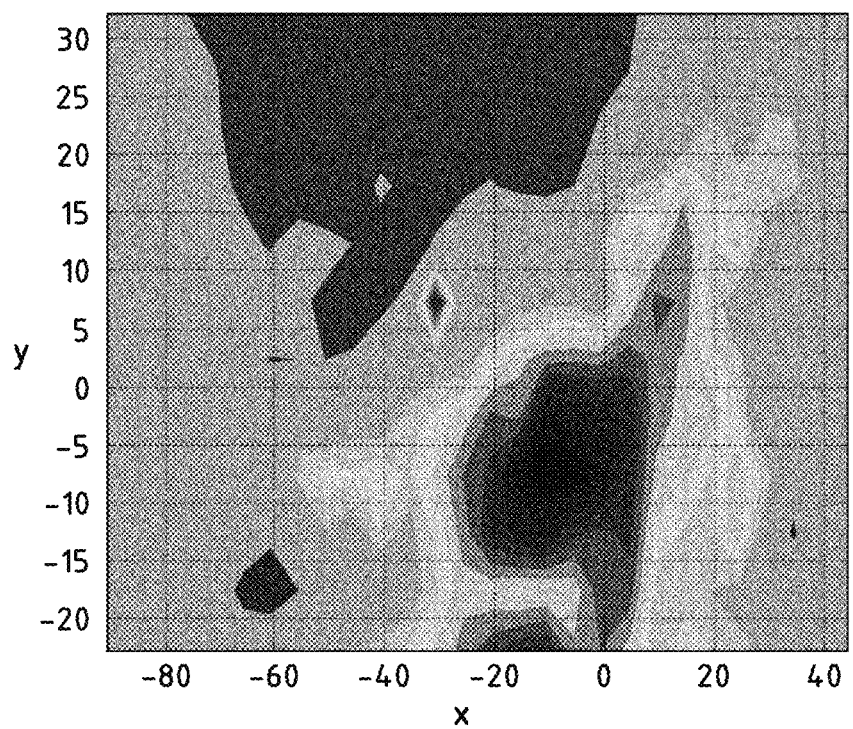
FIG. 9 shows the RMDS of FIG. 7 after having calculated additional radio measurement values by means of extrapolation.

FIG. 9 shows the RMDS of FIG. 7 after having performed the extrapolation step 403. Discrete coordinate grid 702 is now fully occupied. It is therefore possible to apply a discrete frequency transform to the RMDS of FIG. 7, which constitutes the original RMDS subsequently considered. Together the steps 401 to 404 thus serve for generating an original RMDS in the sense of the present invention.

First resorting to interpolation for obtaining radio measurement values for discrete coordinate sets of discrete coordinate grid 702 in step 403 and then resorting to extrapolation only for obtaining the still missing radio measurement values for the remaining discrete coordinate sets in step 404 may yield relatively good radio value estimates. This is because of the broader data basis considered, interpolation may tend to provide results closer to the radio measurement value that would have been obtained if an actual measurement of the respective radio parameter were conducted than extrapolation may provide.

As an aside, in indoor 3D scenarios radio propagation properties may differ significantly in the horizontal and the vertical direction since floor attenuation is often noticeably higher than wall attenuation. It may thus be advisable to use a layered 3D original RMDS, i.e. a set of several 2D RMDSs (one for each floor), and then employ floor-wise interpolation and/or extrapolation to fully occupy each 2D RMDS thereof.

In addition or as an alternative to obtaining a radio measurement value for each discrete coordinate set of the discrete coordinate grid by means of interpolation and extrapolation in steps 403 and 404, another approach may be used. A radio measurement value, i.e. an RSS value in the context of the presently discussed embodiment, may be calculated by means of a model of a radio parameter, i.e. RSS in the present case, of a communication network node (the calculated RSS value thus reflecting the modeled RSS parameter). This approach may prove helpful in terms of accuracy of a thus obtained radio measurement values in comparison to a radio measurement value calculated according to other methods, e.g. interpolation or extrapolation. The RSS model may for instance be derived from the actually measured RSS values 501 (see FIG. 5).

In the context of calculating a radio measurement value by means of a radio parameter model, the discarding of outlier radio measurement values in step 402 may mean that a radio measurement value (or several) of the radio measurement values 501 that differs significantly from several radio measurement values associated with nearby discrete coordinate sets may be discarded. Such an outlier radio measurement value may otherwise deteriorate the quality of a radio parameter model generated based on the actual radio measurement values 501, in turn compromising the quality of a radio measurement value calculated based on the parameter model.

In addition or as an alternative to obtaining a radio measurement value for each discrete coordinate set of the discrete coordinate grid by means of interpolation, extrapolation and/or based on a radio parameter model in steps 403 and 404, a further approach may be used. A radio measurement value, i.e. an RSS value in the context of the presently discussed embodiment, for a discrete coordinate set (which is unoccupied at that point) may be obtained by setting it to a predetermined value. According to the embodiment presently discussed, if a radio measurement value, i.e. RSS value, is obtained by setting it to a predetermined value, the predetermined value may for instance be −100 dBm.

The quality of a frequency transformed RMDS obtained based on an original RMDS comprising radio measurement values obtained by setting them to a predetermined value may still be acceptable. This may be attributed to a low-pass filtering effect of the frequency transform, in particular if only a reduced number of transform coefficients is maintained as will be explained later with respect to step 406. Setting a radio measurement value to a predetermined value may require very low computational effort and only little time to be performed, for instance compared to calculating a radio measurement value by means of interpolation and/or extrapolation and/or based on a radio parameter model.

It is an option to obtain a radio measurement value for each unoccupied discrete coordinate set of the discrete coordinate grid by means of setting them to a predetermined value. However, also the radio measurement values of only one or some of the unoccupied discrete coordinate sets may be set to the predetermined value in steps 403/404. Other unoccupied discrete coordinate sets may be occupied by other means, e.g. by means of interpolation and/or extrapolation and/or based on a radio parameter model.

Returning to the flow chart of FIG. 4, step 405 thereof comprises obtaining a frequency transformed RMDS by applying a DCT to the original RMDS obtained when step 404 has been performed. DCT may be used since all RSS values are real valued.

For an N-dimensional original RMDS comprising radio measurement values r associated with discrete coordinate sets with the structure $(n_0, n_1, \ldots, n_{N-1})$ so that $n_j$ refers to a discrete coordinate (with $n_j=1, N_j$), the N-dimensional DCT $R(k_0, k_1, \ldots, k_{N-1}) = R(k)$, wherein $k=[k_0, \ldots k_{N-1}]$ is an index vector with $k_j[1, N_j]$ which points to an element in the N-dimensional frequency transformed RMDS, may be calculated based on the following equation:

$$R(k_0, k_1, \ldots, k_{N-1}) = \omega(k_0) \ldots \omega(k_{N-1}) \sum_{n_0=1}^{N_0} \ldots \sum_{n_{N-1}=1}^{N_{N-1}} [r(n_0, n_1, \ldots, n_{N-1}) \Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2n_i - 1)(k_i - 1)}{2N_i}\right]$$

and, with $N_j$ being the size of the $j^{th}$ dimension of the RMDS, $$\omega(k_j) = \begin{cases} \dfrac{1}{\sqrt{N_j}}, & \text{if } k_j = 1 \\ \sqrt{\dfrac{2}{N_j}}, & \text{otherwise} \end{cases}$$

According to step 406 of the flow chart of FIG. 4, only a reduced number of the transform coefficients $R(k_0, k_1, \ldots, k_{N-1})$ obtained in step 405 is maintained in the frequency transformed RMDS. Due to the decorrelation property of the DCT, it may suffice to maintain not all of the obtained transform coefficients. Thereby, compression of the frequency transformed RMDS is achieved. The reduced number of transform coefficients may suffice for representing the frequency transformed RMDS. The reconstructed RMDS may still be quite true to the original RMDS Maintaining a reduced number of transform coefficients also has a low pass filtering effect. As actual, interpolated and extrapolated radio measurement values and thus the original RMDS tend to be noisy, the low pass effect may be very welcome. It may even out the noise so that the reconstructed RMDS is potentially even less noisy than the original RMDS.

The reduced number of transform coefficients to be maintained in the frequency transformed RMDS may be a fixed number. Put differently, the number of maintained transform coefficients may be constant each time the method of FIG. 4 is applied. By maintaining a fixed number of transform coefficients, for each frequency transformed RMDS the maintained set of transform coefficients may require the same storage capacity when stored and the same transmission capacity when transmitted. This may greatly simplify resource planning and resource allocation. However, as the spatial correlation of the radio measurement values is not the same for every original RMDS, decorrelation by means of discrete frequency transformation will also not work equally well in any case, i.e. the compression quality will vary. Hence, for a fixed number of transform coefficients maintained, the quality of each reconstructed RMDS will also vary.

Figure 4A:
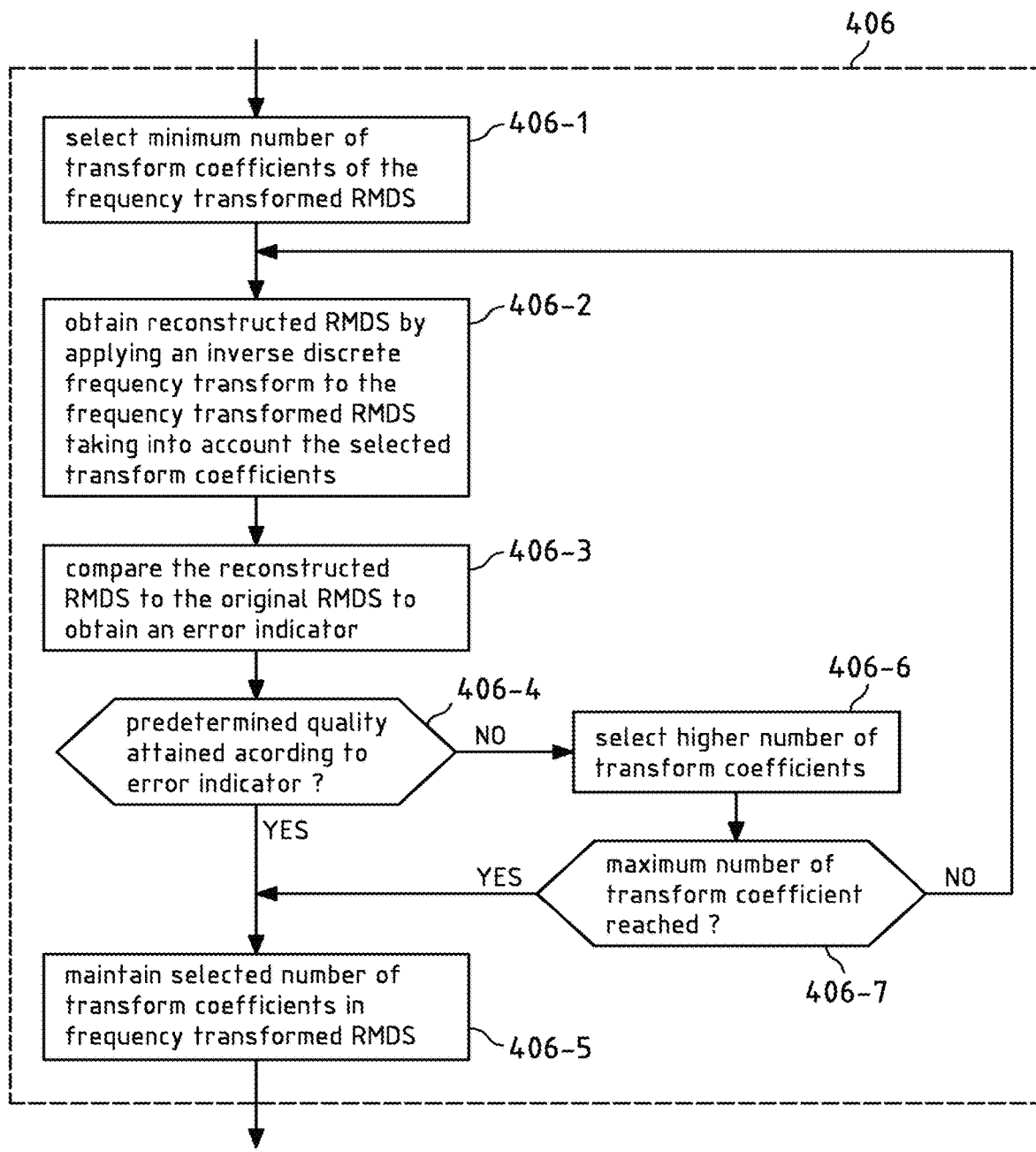
FIG. 4a is a flow chart illustrating a step of the flow chart of FIG. 4 in more detail.

However, instead of maintaining a fixed number of transform coefficients, step 406 may comprise adapting the reduced number of transform coefficients to be maintained in the frequency transformed RMDS to attain a predetermined quality of the frequency transformed RMDS. FIG. 4a shows a flow chart illustrating this implementation of step 406 of the flow chart of FIG. 4 in more detail.

In the present example, the predetermined quality of the frequency transformed RMDS is a minimum quality that has to be attained, i.e. the quality of the frequency transformed RMDS may be higher than the minimum quality but usually not lower than it. Guaranteeing a predetermined quality for each frequency transformed RMDS—and thus for also for the reconstructed RMDSs—may help achieving reliable position estimates based on the reconstructed RMDS. However, as each original RMDS is different and decorrelation by means of discrete frequency transformation will also not work equally well in any case, the number of transform coefficients has to be adapted. As a consequence, for each frequency transformed RMDS the maintained set of transform coefficients is likely not to require the same storage capacity when stored and the same transmission capacity when transmitted. To limit the maximum storage and transmission capacity required, a maximum number of transform coefficients to be maintained is set. In addition, a minimum of transform coefficients to be maintained is set.

Step 406-1 of the flow chart of FIG. 4a comprises selecting the minimum number of transform coefficients of the frequency transformed RMDS obtained in step 405. Assuming that M is the minimum number of transform coefficients, according to step 406-1 the M transform coefficients are not arbitrarily chosen but specific transform coefficients are selected. The selection criterion applied is that the highest absolute value transform coefficients are selected so as to capture the biggest possible part of signal energy of the original RMDS.

In step 406-2, a reconstructed RMDS is obtained by applying an inverse discrete frequency transform to the frequency transformed RMDS taking into account however only the selected transform coefficients.

The original RMDS may have a better quality than the reconstructed RMDS. In particular, the quality may have degraded due to having taken relatively few transform coefficients into account so as to achieve a high data compression rate. So as to determine the quality of the reconstructed RMDS—and thus also of the frequency transformed RMDS—the reconstructed RMDS obtained in step 406-2 is then compared to the original RMDS in step 406-3. To this end reconstructed RMDS is subtracted from the original RMDS by subtracting the RSS values associated with corresponding discrete coordinate sets. The standard deviation of the difference between the original RMDS and the reconstructed RMDS is then determined as an error indicator indicating an error of the reconstructed RMDS. As the reconstructed RMDS has been derived from the frequency transformed RMDS, the error indicator is thus also an indicator for the quality of the frequency transformed RMDS.

In step 406-4 of the flow chart of FIG. 4a, it is then checked if the desired minimum quality of the frequency transformed RMDS is attained if the current number of transform coefficients is maintained. To this end, it is checked if the error indicator does not exceed a certain threshold. If this is the case, the currently selected transform coefficients are maintained in the frequency transformed RMDS as illustrated in step 406-5. It is then continued to step 407 of the flow chart of FIG. 4. If according to the error indicator the minimum quality of the frequency transformed RMDS is however not attained, one additional transform coefficient, i.e. the transform coefficient with the highest value of all remaining transform coefficients, is selected in step 406-6.

Step 406-7 comprises checking if the maximum number of transform coefficients that may be maintained is already reached. If true, the control flow continues to step 406-5 and the presently selected transform coefficients are maintained. A further quality check is obsolete since maintaining even more transform coefficients in the frequency transformed RMDS is anyway not permitted. Yet, if the maximum number of transform coefficients has not been reached, execution of steps 406-2, 406-3 and 406-4 is repeated so as to find out if the minimum quality of the frequency transformed RMDS has been attained by including the additional transform coefficient in step 406-7. It is then continued with executing steps 406-5 to 406-7 as described before.

The result of step 406 of the flow chart of FIG. 4 thus is that at least a minimum number of transform coefficients is maintained in the frequency transformed RMDS. If a lower number of transform coefficients than the maximum number of transform coefficients is sufficient for attaining the desired minimum quality, this number of transform coefficients is maintained. The number of transform coefficients does however not fall under the prescribed minimum number. Otherwise, the maximum number of transform coefficients is maintained. It is apparent from FIG. 4a that adapting the reduced number of transform coefficients is based on the error indicator. The approach to determining the number of transform coefficients to be maintained and to selecting specific transform coefficients described above with respect to FIG. 4a may help obtaining a good ratio of compression and accuracy.

Figure 10A:
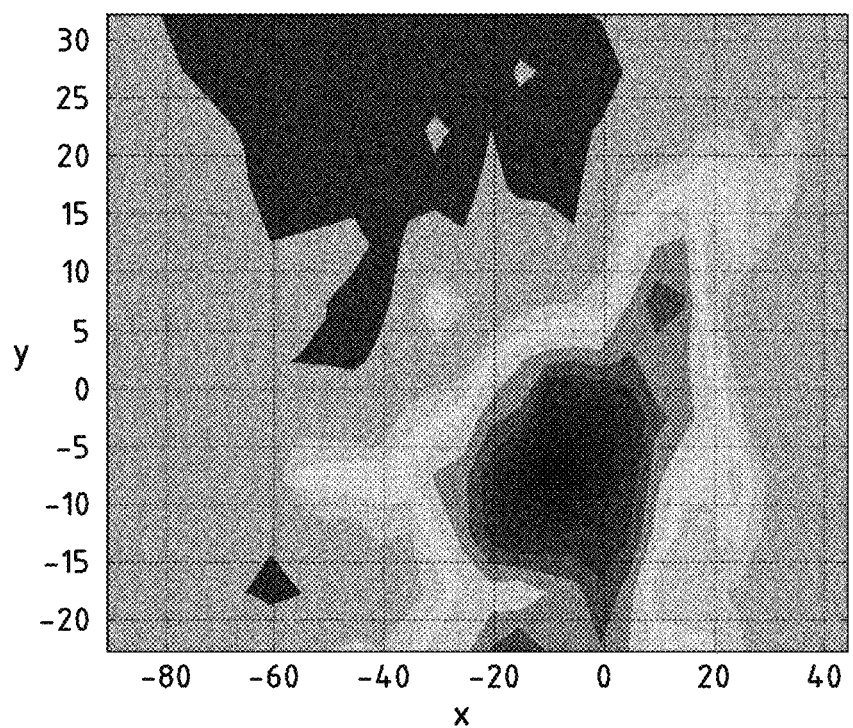
FIG. 10a shows a reconstructed RMDS obtained by applying an inverse discrete frequency transform to a frequency transformed RMDS obtained by applying a discrete frequency transform to the RMDS illustrated in FIG. 9, wherein a reduced number of transform coefficients has been maintained in the frequency transformed RMDS.

FIG. 10a shows a reconstructed RMDS obtained by applying an inverse discrete frequency transform to a frequency transformed RMDS obtained by applying a discrete frequency transform to the RMDS illustrated in FIG. 9, wherein a reduced number of 80 transform coefficients has been maintained in the frequency transformed RMDS. The reconstructed RMDS of FIG. 10b is based on a frequency transformed RMDS with only 40 transform coefficients, while FIG. 10c gives an impression of the result of using 20 transform coefficients and FIG. 10d illustrates the result of using just 10 transform coefficients.

Figure 10B:
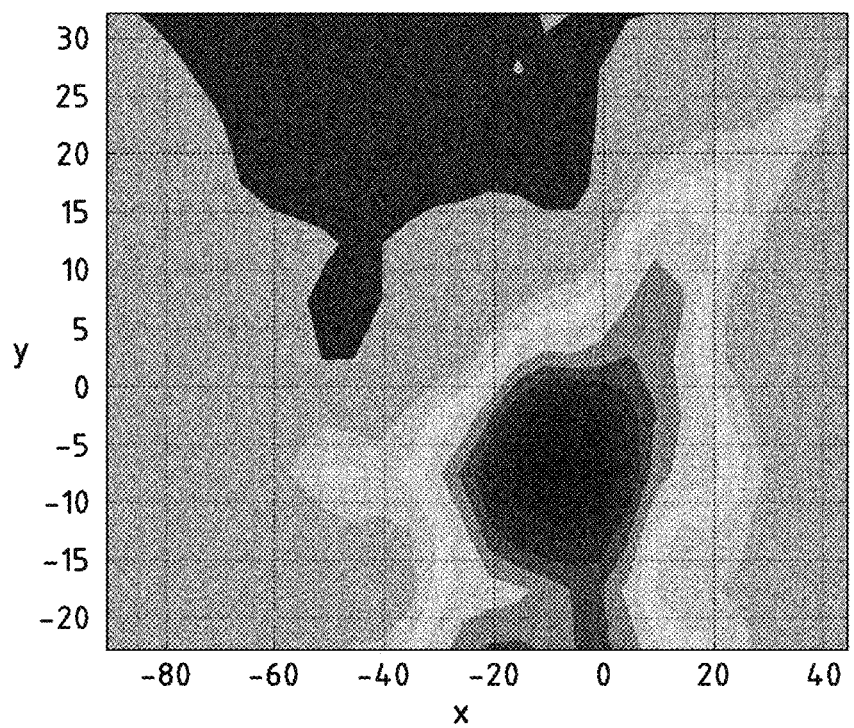
FIG. 10b shows a reconstructed RMDS obtained as that of FIG. 10a, however from a frequency transformed RMDS with a lower number of maintained transform coefficients.
Figure 10C:
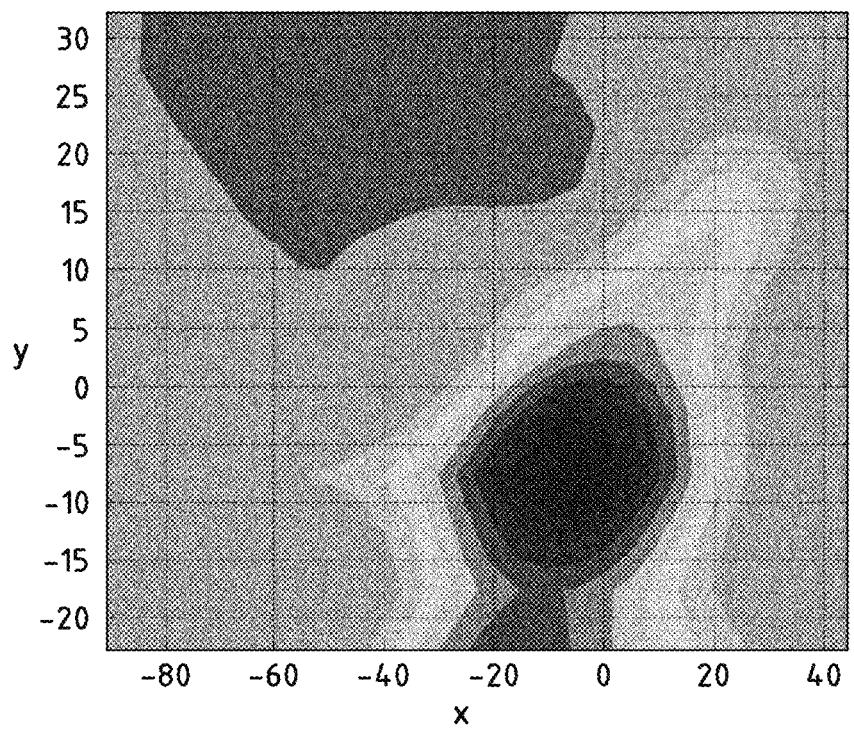
FIG. 10c shows a reconstructed RMDS with an even lower number of maintained transform coefficients in the frequency transformed RMDS than in the case of FIG. 10b.
Figure 10D:
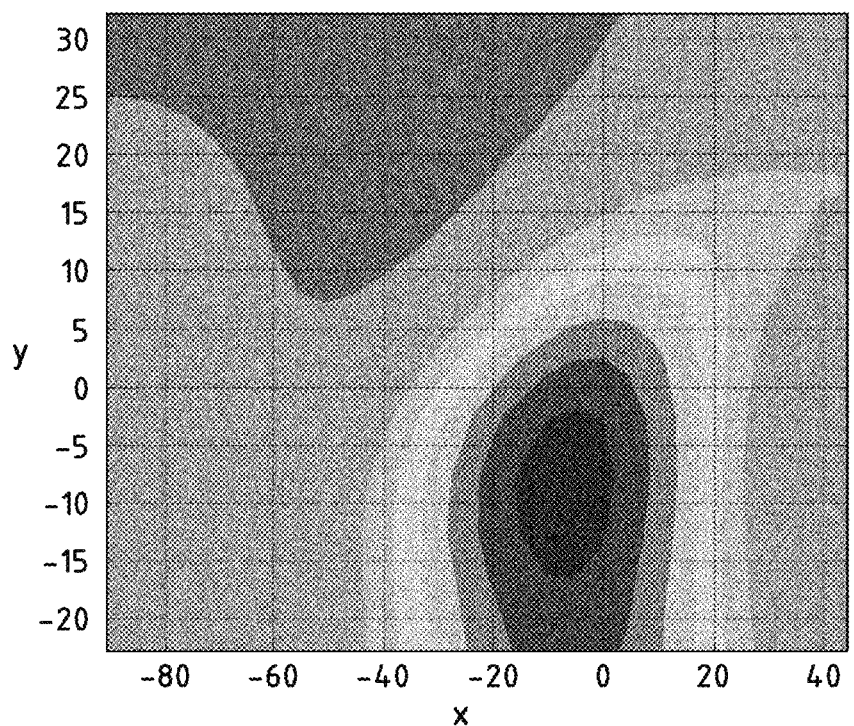
FIG. 10d shows a reconstructed RMDS with an even lower number of maintained transform coefficients in the frequency transformed RMDS than in the case of FIG. 10c.

Comparing FIG. 9, FIG. 10a, FIG. 10b, FIG. 10c and FIG. 10d makes clear that the fewer transform coefficients are taken into account, the less information from the original RMDS of FIG. 9 can be reconstructed. While the reconstructed RMDS of FIG. 10a is still quite close to the original RMDS of FIG. 9, the reconstructed RMDSs of FIG. 10b, FIG. 10c and FIG. 10d are much coarser. Details are lost. Reducing the number of transform coefficients has a low pass filtering effect. This may be welcome to a certain degree, since the low pass filtering evens out noise in the original RMDS.

Figure 11:
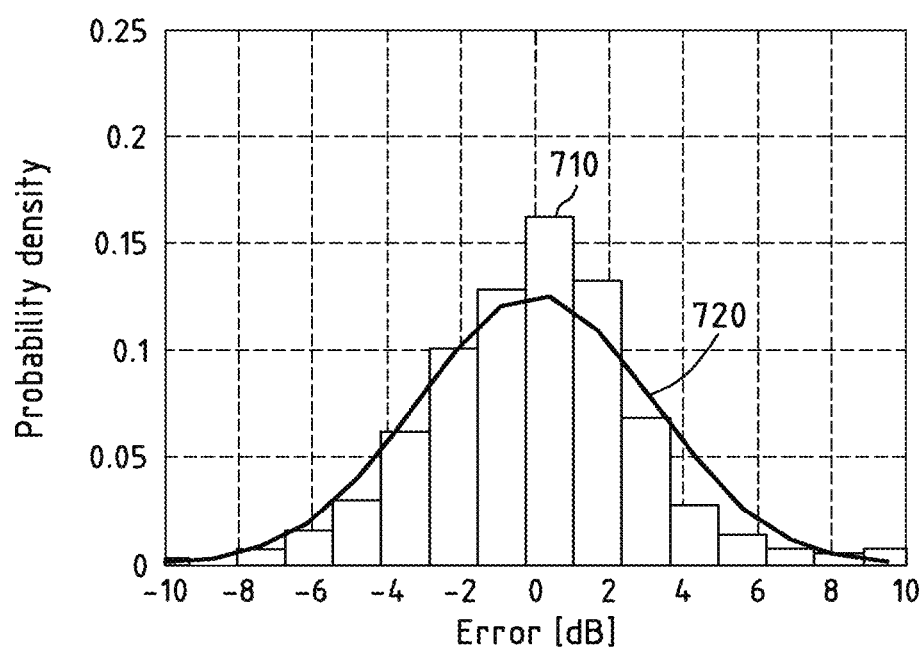
FIG. 11 is an illustration of the error of the reconstructed RMDS of FIG. 10b in comparison to the original RMDS of FIG. 9.

FIG. 11 illustrates the error of the reconstructed RMDS of FIG. 10b (40 transform coefficients maintained in the underlying frequency transformed RMDS) in comparison to the original RMDS of FIG. 9. The horizontal axis indicates the error of the reconstructed RMDS, i.e. the difference between the original RMDS and the reconstructed RMDS, measured in dB. The height of the bars 710 indicates the probability density of the respective error on the vertical axis. Curve 720 is a fitted Gaussian distribution. The standard deviation of this Gaussian distribution may serve as an error indicator in steps 406-3 and 406-4 of the flow chart of FIG. 4a.

Returning to FIG. 4, once maintaining a reduced number of transform coefficients in step 406 has been concluded, it is proceeded to step 407. Step 407 comprises applying run length encoding to the frequency transformed RMDS. Thereby, additional compression is achieved. In contrast to the approach of compressing the original RMDS by applying a discrete frequency transform thereto and maintaining only a reduced number of transform coefficients, run length encoding is a lossless compression method. As only a reduced number of transform coefficients of the frequency transformed RMDS has been maintained in step 406, the frequency transformed RMDS has transform coefficients that are zero and may become sparse. According to the run length encoding applied, jumps denote transform coefficients with value zero. The run length encoding used is therefore particularly well suited to the compression of frequency transformed RMDSs. Having applied the run length encoding to the frequency transformed RMDS and having compressed the frequency transformed RMDS by means of run length encoding, run length decoding has of course to be applied before a reconstructed RMDS may be obtained.

Finally, in step 408, the run length encoded frequency transformed RMDS is stored together with the error indicator determined in step 406, namely in step 406-3 (see FIG. 4a). The error indicator is stored because it provides information on the quality of the frequency transformed RMDS and thus also on the quality of a reconstructed RMDS that is obtained therefrom. The error indicator may be used in estimating the uncertainty of a position estimate obtained based on the reconstructed RMDS.

Similar to the embodiment described in the flow chart of FIG. 2, steps such as providing the compressed frequency transformed RMDS together with the error indicator to another apparatus, obtaining a reconstructed RMDS by applying an inverse discrete frequency transform to the frequency transformed RMDS (after decompression) and determining a position of an apparatus based on the reconstructed RMDS may of course be performed subsequent to step 408 although not shown in the flow chart of FIG. 4.

Figure 12:
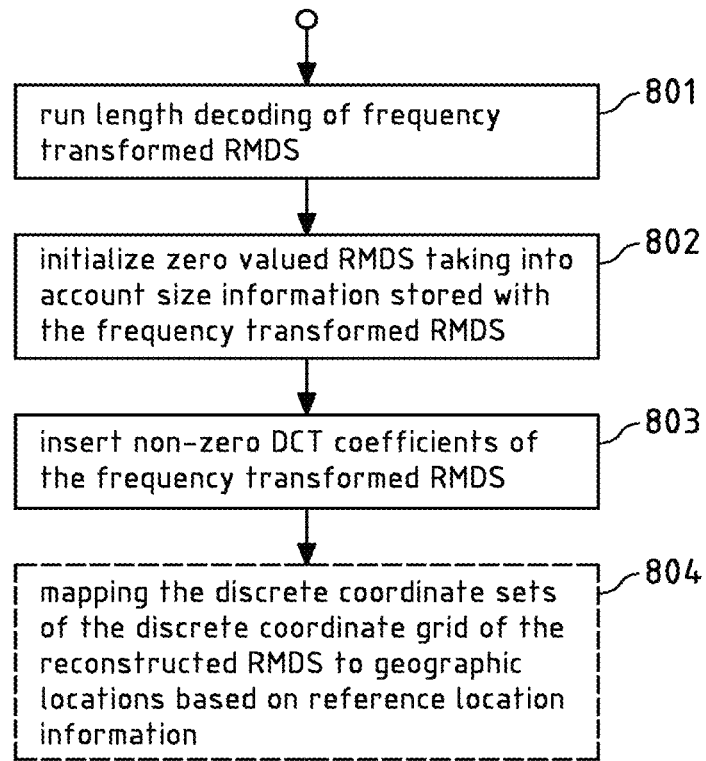
FIG. 12 is a flow chart giving an overview of an exemplary process for obtaining a reconstructed RMDS.

An overview on the process of obtaining the reconstructed RMDS is given in the flow chart of FIG. 12. This process may be considered as a second embodiment of the method according to the second aspect of the invention.

Step 801 comprises run length decoding of the frequency transformed RMDS obtained in 408 of the flow chart of FIG. 4.

In step 802, a zero valued RMDS is initialized. The RMDS comprises a discrete coordinate grid, the dimensions of the discrete coordinate grid being $N_0, N_1, \ldots, N_{N-1}$. The size of this discrete coordinate grid is derived from information on the size of the discrete coordinate grid 702 of the original RMDS. This size information has been taken from the original RMDS and has then been stored together with the frequency transformed RMDS so that it is available for RMDS reconstruction. In initialization step 802, each of the discrete coordinate sets of the grid is associated with zero as an initial radio measurement value. The thus obtained RMDS may be written as $R_{recov}(k)=0$.

Step 803 comprises inserting the non-zero DCT transform coefficients maintained in the frequency transformed RMDS at their respective discrete coordinate sets in the discrete coordinate grid of the RMDS generated in step 802. With the dimensions of the discrete coordinate grid being $N_0, N_1, \ldots, N_{N-1}$, and $R(k_j)$ and $k_j$ being the maintained DCT coefficients and their indices for $j=0 \ldots N_{components}-1$, this step may be described as setting $R_{recov}(k_j)$ to $R(k_j)$.

Having calculated the frequency transformed RMDS by applying a DCT to the original RMDS as explained with respect to step 405 of the flow chart of FIG. 4, the reconstructed RMDS may be obtained by applying the IDCT to the RMDS after its initialization has been completed in step 803. This is done in step 804.

The reconstructed RMDS $r(n_0, n_1, \ldots, n_{N-1})$ may be calculated according to the following equation:

$$r(n_0, n_1, \ldots, n_{N-1}) = \sum_{k_0=1}^{N_0} \ldots \sum_{k_{N-1}=1}^{N_{N-1}} [\omega(k_0) \ldots \omega(k_{N-1}) R_{recov}(k_0, k_1, \ldots, k_{N-1})$$

$$\Phi(n_0, k_0, N_0) \ldots \Phi(n_{N-1}, k_{N-1}, N_{N-1})]$$

Therein, $$\Phi(n_i, k_i, N_i) = \cos\left[\frac{\pi(2k_i-1)(n_i-1)}{2N_i}\right]$$

and $$\omega(k_j) = \begin{cases} \frac{1}{\sqrt{N_j}}, & \text{if } k_j = 1 \\ \sqrt{\frac{2}{N_j}}, & \text{otherwise} \end{cases}.$$

In optional step 804, the discrete coordinate sets of the reconstructed RMDS may be mapped to geographic locations, i.e. latitude and longitude pairs, based on reference location information. To this end, the reference location information comprises information on the geographic location of a discrete coordinate set located at a corner of the discrete coordinate grid and information on the geographical distance between neighboring valid discrete coordinate sets for each dimension of the discrete coordinate grid. The reference location information has been taken from the original RMDS and then been stored with the frequency transformed RMDS so that it is available when needed after RMDS reconstruction for position estimation.

Optional step 804 may be omitted and the mapping to geographic locations (or from geographic locations to discrete coordinate sets) may be performed in the process of estimating a position based on the reconstructed RMDS. This is assumed in the following example of a position estimation approach.

Position estimation may be performed as follows based on a reconstructed RMDS comprising RSS values of a communication node i $RSS_i^{reconstructed}$ as radio measurement values and observed RSS values $RSS_i^{observed}$:

Assuming that $n_i(\ )$ is a function that, using the stored reference location information, maps geographic coordinate sets (x,y,z) to discrete coordinate sets of the discrete coordinate grid of the reconstructed RMDS for node i, and that $r_i(\ )$ is a radio measurement value of the reconstructed RMDS for that node, the RSS of node i at the geographic coordinate set (x,y,z) may be written as $$RSS_i^{reconstructed} = r_i(n_i(x,y,z)) + w_i.$$

Therein, $w_i$ is an error source. The error source $w_i$ is assumed as a Gaussian distributed random variable with variance $\sigma_w^2$ and it includes measurement uncertainty and the previously defined compression uncertainty as reflected by the error indicator. The likelihood of observing $RSS_i^{observed}$ at the given location (x,y,z) is thus given by p($RSS_i^{observed}$ |x,y,z), which may then be calculated as follows:

$$p(RSS_i^{observed} | x, y, z) = \frac{1}{\sqrt{2\pi\sigma_w^2}} \exp\left(\frac{-(RSS_i^{observed} - RSS_i^{reconstructed})^2}{2\sigma_w^2}\right).$$

This equation can be rewritten as $$p(RSS_i^{observed} | x, y, z) = \frac{1}{\sqrt{2\pi\sigma_w^2}} \exp\left(\frac{-(RSS_i^{observed} - r_i(n_i(x, y, z)))^2}{2\sigma_w^2}\right).$$

Assuming that $N_{RSS}$ nodes are observed, the maximum likelihood position estimate is given as $$(\hat{x}, \hat{y}, \hat{z}) = \max_{x,y,z} \sum_{i=0}^{N_{RSS}-1} \log p(RSS_i^{observed} | x, y, z).$$

One considerable advantage of the RMDS based positioning is that it directly offers likelihood for each discrete coordinate set within the limits of the discrete coordinate grid, and therefore, the shape of the likelihood function is not restricted.

FIG. 13 shows a block diagram of an apparatus 900 according to an embodiment of the invention. The apparatus 900 may represent an embodiment of the first or second apparatus according to the first aspect of the invention or an embodiment of the first or second apparatus according to the second aspect of the invention.

Apparatus 900 may for instance be or form a part (e.g. as a module) of a mobile terminal, e.g. mobile terminal 120 of FIG. 1, or of a server, e.g. server 140 of FIG. 1. Non-limiting examples of a mobile terminal are a cellular phone, a personal digital assistant, a laptop computer, a tablet computer or a multimedia player.

Apparatus 900 comprises a processor 960. Processor 960 may represent a single processor or two or more processors, which are for instance at least partially coupled, for instance via a bus. Processor 960 executes a program code stored in program memory 910 (for instance program code causing apparatus 900 to perform one or more of the embodiments of a method according to the invention (as for instance further described above with reference to the flow charts of FIGS. 2, 3, 4, 4a and 12), when executed on processor 960), and interfaces with a main memory 920. Some or all of memories 910 and 920 may also be included into processor 960. One of or both of memories 910 and 920 may be fixedly connected to processor 960 or at least partially removable from processor 960, for instance in the form of a memory card or stick. Program memory 910 may for instance be a non-volatile memory. Examples of such tangible storage media will be presented with respect to FIG. 14 below. It may for instance be a FLASH memory (or a part thereof), any of a ROM, PROM, EPROM and EEPROM memory (or a part thereof) or a hard disc (or a part thereof), to name but a few examples. Program memory 910 may also comprise an operating system for processor 960. Program memory 910 may for instance comprise a first memory portion that is fixedly installed in apparatus 900, and a second memory portion that is removable from apparatus 900, for instance in the form of a removable SD memory card. One or more RMDSs that are processed or generated by apparatus 900 when executing one of the methods of the present invention may for instance be stored in program memory 910. Main memory 920 may for instance be a volatile memory. It may for instance be a RAM or DRAM memory, to give but a few non-limiting examples. It may for instance be used as a working memory for processor 960 when executing an operating system and/or programs.

Processor 960 may further control a communication interface 930 (or several communication interfaces) configured to receive and transmit radio signals. As communication interface 930 is an optional component of apparatus 900, it is shown with dashed outlines.

For instance, if the apparatus 900 forms part of mobile terminal 120 of FIG. 1, communication interface 930 may be configured to identify nodes 131, 132 and 133 of system 100 of FIG. 1. It may in this case also be used to measure radio parameters based on signals received from nodes 131, 132 and 133, i.e. to obtain actual radio measurement values, and/or to exchange information with server 140 of system 100 or with other mobile terminals. The communication interface may in particular serve for transmitting radio measurement values and node identification information from the mobile terminal 120 to the server 140 if a position of the mobile terminal 120 is to be determined by the server 140. If position estimation is performed at the mobile terminal 120, the mobile terminal 120 may use the communication interface 930 for receiving a frequency transformed (or reconstructed) RMDS from server 120.

If the apparatus is for instance part of the server 140 of FIG. 1, the communication interface 930 may inter alia serve for receiving radio measurement values and for transmitting a position estimate or a frequency transformed (or reconstructed) RMDS.

Communication interface 930 may for instance be a wireless communication interface. Communication interface 930 may thus for instance comprise circuitry such as modulators, filters, mixers, switches and/or one or more antennas to allow transmission and/or reception of signals. Communication interface 930 may for instance be configured to allow communication in a 2G/3G/4G cellular communication network and/or a non-cellular communication network, such as for instance a WLAN network. Nevertheless, communication interface 930 may also provide wire-bound communication capabilities.

Processor 960 may further control an optional user interface 940 configured to present information to a user of apparatus 900 and/or to receive information from such a user.

If the apparatus for instance forms part of a mobile terminal, e.g. mobile terminal 120 of FIG. 1, user interface may for instance present a position estimate to the user of the mobile terminal. User interface 940 may for instance be the standard user interface via which a user of apparatus 900 controls the functionality thereof, such as making phone calls, browsing the Internet, etc.

Processor 20 may further control an optional GNSS interface 950 configured to receive positioning information of an GNSS. A GNSS interface may in particular be provided if apparatus 900 forms part of a mobile terminal, e.g. mobile terminal 120 of FIG. 1. It should be noted that, even in case apparatus 900 has a GNSS interface 950, the user of apparatus 900 (or the mobile terminal comprising apparatus 900) can still benefit from using RMDS-based positioning technologies, since these technologies may allow for significantly reduced time-to-first-fix and/or lower power consumption as compared to GNSS-based positioning. Also, and perhaps even more important, RMDS-based positioning technologies work indoors, which is generally a challenging environment for GNSS-based technologies. If optional communication interface 930 and optional GNSS interface 950 both are provided in apparatus 900, apparatus 900 may be used to obtain fingerprints, i.e. triples of actual radio measurement values, node identification information and location information, and make them available for positioning purposes.

The components 910-950 of apparatus 900 may for instance be connected with processor 960 by means of one or more serial and/or parallel busses.

It is to be noted that the circuitry formed by the components of apparatus 900 may be implemented in hardware alone, partially in hardware and in software, or in software only, as further described at the end of this specification.

A step performed by apparatus 900 may preferably be understood such that corresponding program code is stored in memory 910 and that the program code and the memory are configured to, with processor 960, cause apparatus 900 to perform the step. Equally well, a step performed by apparatus 900 may preferably be understood such that apparatus 900 comprises according means for performing this step. For instance, processor 960 together with memory 910 and the program code stored there and together with memory 920 may be considered as means for applying a discrete frequency transform to an original RMDS and thus as means for obtaining a frequency transformed RMDS by doing so if the program code stored in memory 910 is selected accordingly. Likewise, processor 960 together with memory 910 and the program code stored there and together with memory 920 may be considered as means for applying an inverse discrete frequency transform to a frequency transformed RMDS and thus as means for obtaining a reconstructed RMDS by doing so if the program code stored in memory 910 is selected accordingly.

When apparatus 900 performs a method according to the first or second aspect of the invention (e.g. a method a further described above with reference to the flow charts of FIGS. 2, 3, 4, 4*a* and 12) the apparatus may thus be considered as an embodiment of the first or second apparatus according to the first aspect of the invention or as an embodiment of the first or second apparatus according to the second aspect of the invention, respectively. Likewise, the program memory 910 of apparatus 900, which may in particular be a non-transitory storage medium, may be considered as an embodiment of a tangible storage medium according to the first or the second aspect of the invention if corresponding computer program code (for instance a set of instructions) is stored therein.

Figure 14:
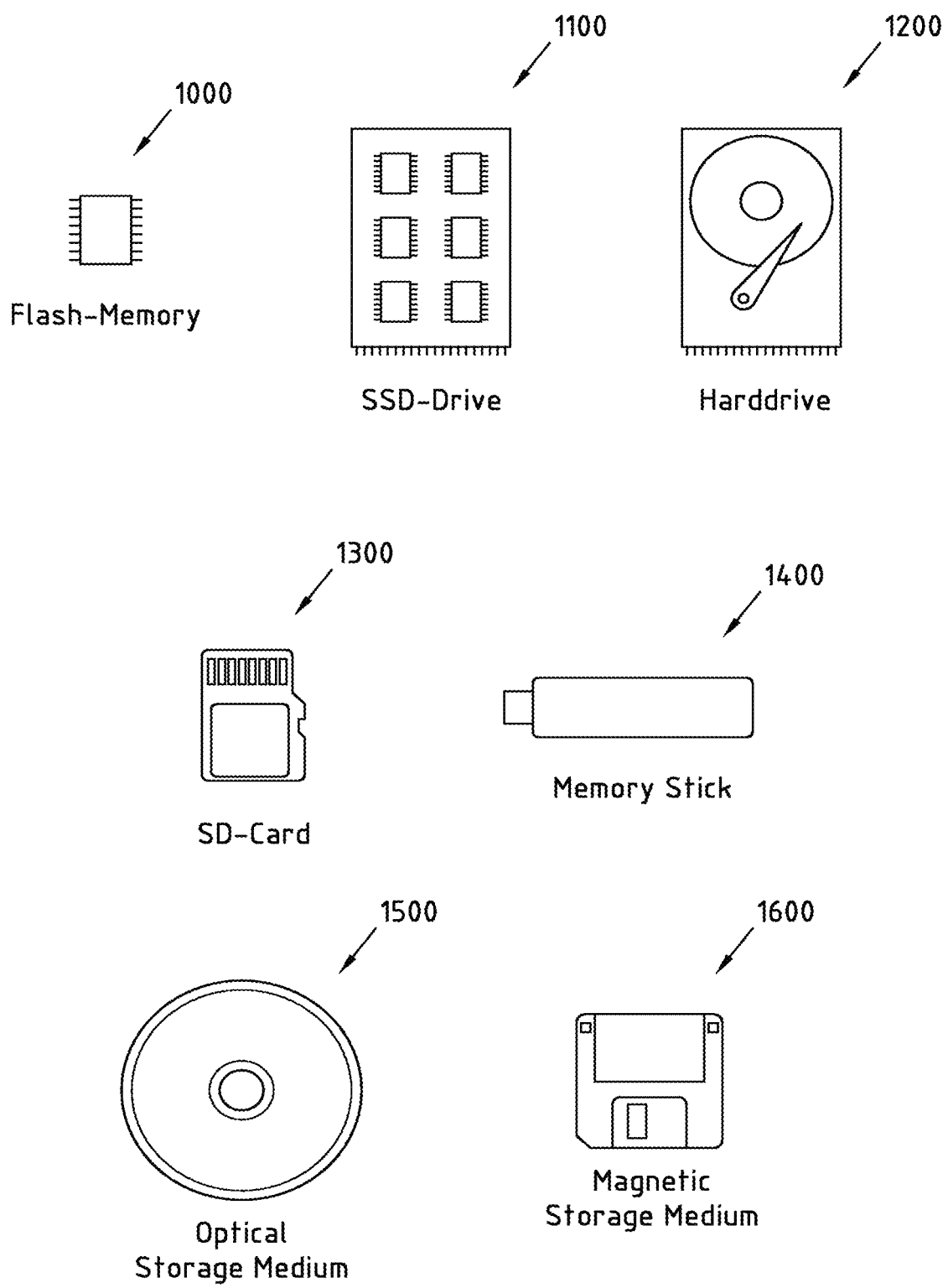
FIG. 14 is a schematic illustration of examples of tangible storage media according to the present invention.

FIG. 14 schematically illustrates examples of tangible storage media according to the present invention that may for instance be used to implement program memory 910 of FIG. 13. To this end, FIG. 14 displays a flash memory 1000, which may for instance be soldered or bonded to a printed circuit board, a solid-state drive 1100 comprising a plurality of memory chips (e.g. Flash memory chips), a magnetic hard drive 1200, a Secure Digital (SD) card 1300, a Universal Serial Bus (USB) memory stick 1400, an optical storage medium 1500 (such as for instance a CD-ROM or DVD) and a magnetic storage medium 1600.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 960 of FIG. 13, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function. Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

We claim:

1. A method for obtaining a frequency transformed radiomap data set, the method comprising:
    obtaining a radio measurement value for at least one discrete coordinate set of a discrete coordinate grid;
    identifying an original radiomap data set based on the radio measurement value for the at least one discrete coordinate set of the discrete coordinate grid;
    applying a discrete frequency transform to the original radiomap data set;
    generating a frequency transformed radiomap data set from the discrete frequency transform; and
    storing the frequency transformed radiomap data set for position calculation.

2. The method of claim 1, wherein the frequency transformed radiomap data set requires less storage capacity than the original radiomap data set.

3. The method of claim 1, wherein obtaining a radio measurement for each discrete coordinate set of the discrete coordinate grid comprises:
    calculating a radio measurement value for a discrete coordinate set of the discrete coordinate grid by interpolation.

4. The method of claim 1, wherein obtaining a radio measurement for each discrete coordinate set of the discrete coordinate grid comprises:
    calculating a radio measurement value for a discrete coordinate set of the discrete coordinate grid by extrapolation.

5. The method of claim 1, wherein obtaining a radio measurement for each discrete coordinate set of the discrete coordinate grid comprises:
    first calculating a radio measurement value for a discrete coordinate set of the discrete coordinate grid by interpolation and subsequently calculating a radio measurement value for a discrete coordinate set of the discrete coordinate grid by extrapolation.

6. The method of claim 1, wherein obtaining a radio measurement for each discrete coordinate set of the discrete coordinate grid comprises:
    calculating a radio measurement value for a discrete coordinate set of the discrete coordinate grid by of a model of a radio parameter of a communication network node, the radio measurement value reflecting the radio parameter.

7. The method of claim 1, wherein obtaining a radio measurement for each discrete coordinate set of the discrete coordinate grid comprises:
    setting radio measurement value to a predetermined value.

8. The method of claim 1, further comprising:
    applying an inverse discrete frequency transform to the frequency transformed radiomap data set.

9. The method of claim 8, further comprising:
    obtaining a reconstructed radiomap data set from the inverse discrete frequency transform.

10. The method of claim 9, further comprising:
    performing a comparison of the reconstructed radio snap data set to the original radiomap data set; and
    determining, in response to the comparison, an error indicator indicating an error of the reconstructed radiomap data set.

11. The method of claim 10, further comprising:
    adapting a number of transform coefficients is based on the error indicator.

12. At least one apparatus comprising at least one processor and at least one memory including at least one computer program code, the at least one memory and the at least one computer program code configured to, with the at least one processor, cause at least one an apparatus at least to perform:
    obtaining a radio measurement value for at least one discrete coordinate set of a discrete coordinate grid;
    identifying an original radiomap data set based on the radio measurement value for the at least one discrete coordinate set of the discrete coordinate grid;
    applying a discrete frequency transform to the original radiomap data set;
    generating a frequency transformed radiomap data set from the discrete frequency transform;
    storing the frequency transformed radiomap data set for position calculation.

13. The apparatus of claim 12, wherein the frequency transformed radiomap data set requires less storage capacity than the original radiomap data set.

14. The apparatus of claim 12, wherein obtaining a radio measurement for each discrete coordinate set of the discrete coordinate grid comprises:
    calculating a radio measurement value for a discrete coordinate set of the discrete coordinate grid by interpolation.

15. The apparatus of claim 12, wherein obtaining a radio measurement for each discrete coordinate set of the discrete coordinate grid comprises:

calculating a radio measurement value for a discrete coordinate set of the discrete coordinate grid by extrapolation.

16. The apparatus of claim 12, wherein obtaining a radio measurement for each discrete coordinate set of the discrete coordinate grid comprises:

first calculating a radio measurement value for a discrete coordinate set of the discrete coordinate grid by interpolation and subsequently calculating a radio measurement value for a discrete coordinate set of the discrete coordinate grid by extrapolation.

17. The apparatus of claim 12, wherein obtaining a radio measurement for each discrete coordinate set of the discrete coordinate grid comprises:

calculating a radio measurement value for a discrete coordinate set of the discrete coordinate grid by of a model of a radio parameter of a communication network node, the radio measurement value reflecting the radio parameter.

18. The apparatus of claim 12, wherein obtaining a radio measurement for each discrete coordinate set of the discrete coordinate grid comprises:

setting a radio measurement value to a predetermined value.

19. A non-transitory computer readable storage medium is described, in which computer program code is stored, the program code including instruction to perform a method comprising:

obtaining a radio measurement value for at least one discrete coordinate set of a discrete coordinate grid;

identifying an original radiomap data set based on the radio measurement value for the at least one discrete coordinate set of the discrete coordinate grid;

applying a discrete frequency transform to the original radiomap data set;

generating a frequency transformed radiomap data set from the discrete frequency transform;

obtaining a reconstructed radiomap data set from the inverse discrete frequency transform;

performing a comparison of the reconstructed radio map data set to the original radiomap data set; and determining, in response to the comparison, an error indicator indicating an error of the reconstructed radiomap data set.

20. The non-transitory readable storage medium of claim 19, the program code including instruction to perform the method further comprising:

storing the frequency transformed radiomap data set for position calculation.

* * * * *